US006947442B1

(12) United States Patent
Sato et al.

(10) Patent No.: US 6,947,442 B1
(45) Date of Patent: Sep. 20, 2005

(54) DATA TRANSFER CONTROL DEVICE AND ELECTRONIC EQUIPMENT

(75) Inventors: Daisuke Sato, Suwa (JP); Hiroshi Horiuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 796 days.

(21) Appl. No.: 09/688,045

(22) Filed: Oct. 12, 2000

(30) Foreign Application Priority Data

Oct. 15, 1999 (JP) ................................ 11-293590

(51) Int. Cl.[7] .......................................... H04L 12/403
(52) U.S. Cl. ..................................... 370/447; 370/462
(58) Field of Search ................................ 370/447, 446, 370/495, 463, 462, 489, 252, 254, 426, 429, 370/289, 255, 474; 710/107, 112–114, 115, 710/116, 109, 305

(56) References Cited

U.S. PATENT DOCUMENTS

| 5,343,473 | A | * | 8/1994 | Cidon et al. ................ 370/465 |
| 5,440,752 | A | * | 8/1995 | Lentz et al. ................. 710/123 |
| 5,557,608 | A | * | 9/1996 | Calvignac et al. .......... 370/389 |
| 5,822,568 | A | * | 10/1998 | Swanstrom ................... 703/24 |
| 6,032,261 | A | * | 2/2000 | Hulyalkar .................... 713/400 |
| 6,374,319 | B1 | * | 4/2002 | Singh ........................... 710/107 |
| 6,389,496 | B1 | * | 5/2002 | Matsuda ....................... 710/316 |
| 6,445,718 | B1 | * | 9/2002 | Muto ............................ 370/474 |
| 6,473,816 | B1 | * | 10/2002 | Yoshida et al. ............. 710/113 |
| 6,523,058 | B1 | * | 2/2003 | Fung et al. .................. 718/100 |
| 6,574,688 | B1 | * | 6/2003 | Dale et al. ..................... 700/52 |
| 6,584,539 | B1 | * | 6/2003 | James et al. ................. 710/314 |
| 6,633,547 | B1 | * | 10/2003 | Akatsu et al. ............... 370/255 |
| 2003/0005194 | A1 | * | 1/2003 | Stone et al. ................. 710/107 |
| 2004/0139386 | A1 | * | 7/2004 | Ishimura et al. ............ 715/500 |

FOREIGN PATENT DOCUMENTS

| EP | 0 582 537 A | 2/1994 | |
| EP | 0 684 719 A | 11/1995 | |
| EP | 849913 A2 | * 6/1998 | ........... H01L 12/28 |
| JP | A 10-178438 | 6/1998 | |

OTHER PUBLICATIONS

"1394 Bridge Controller, INIC-1410: ATA/ATAPI IDE to IEEE1394 Bridge Controller Solution"; Taking Data Further. ™; Initio Corporation; Feb. 1, 2000.
"SAA7356HL, p1394a Compatibility Asynchronous Link Layer Controller"; Philips Semiconductors Co., Ltd.
http:/www.oxsemi.com/products/main.html;  "Laser product—the OXFW900".

* cited by examiner

Primary Examiner—Chau Nguyen
Assistant Examiner—Ian N. Moore
(74) Attorney, Agent, or Firm—Oliff & Berridge, PLC

(57) ABSTRACT

A data transfer control device and electronic equipment that make it possible to implement high-speed data transfer with reduced overhead processing of firmware and smaller hardware. A data transfer control device that conforms to the IEEE 1394 standard comprises an arbitration circuit that permits firmware (FW) transfer after the completion of one transaction (or one packet transfer) in the continuous packet transfer, if the CPU issues an FW transfer start command during the execution of continuous hardware transfer (HW transfer) processing by a SBP-2 core. If HWStart and FWStart signals go active together, the FW transfer has priority. A header area in RAM is divided into an ordinary header area and an HW header area, and an address generation circuit switches between generating addresses for the ordinary header area and addresses for the HW header area, based on an HWDMARun signal from the arbitration circuit. A data area in RAM is divided into an ORB area and a stream area for the SBP-2 core.

16 Claims, 30 Drawing Sheets

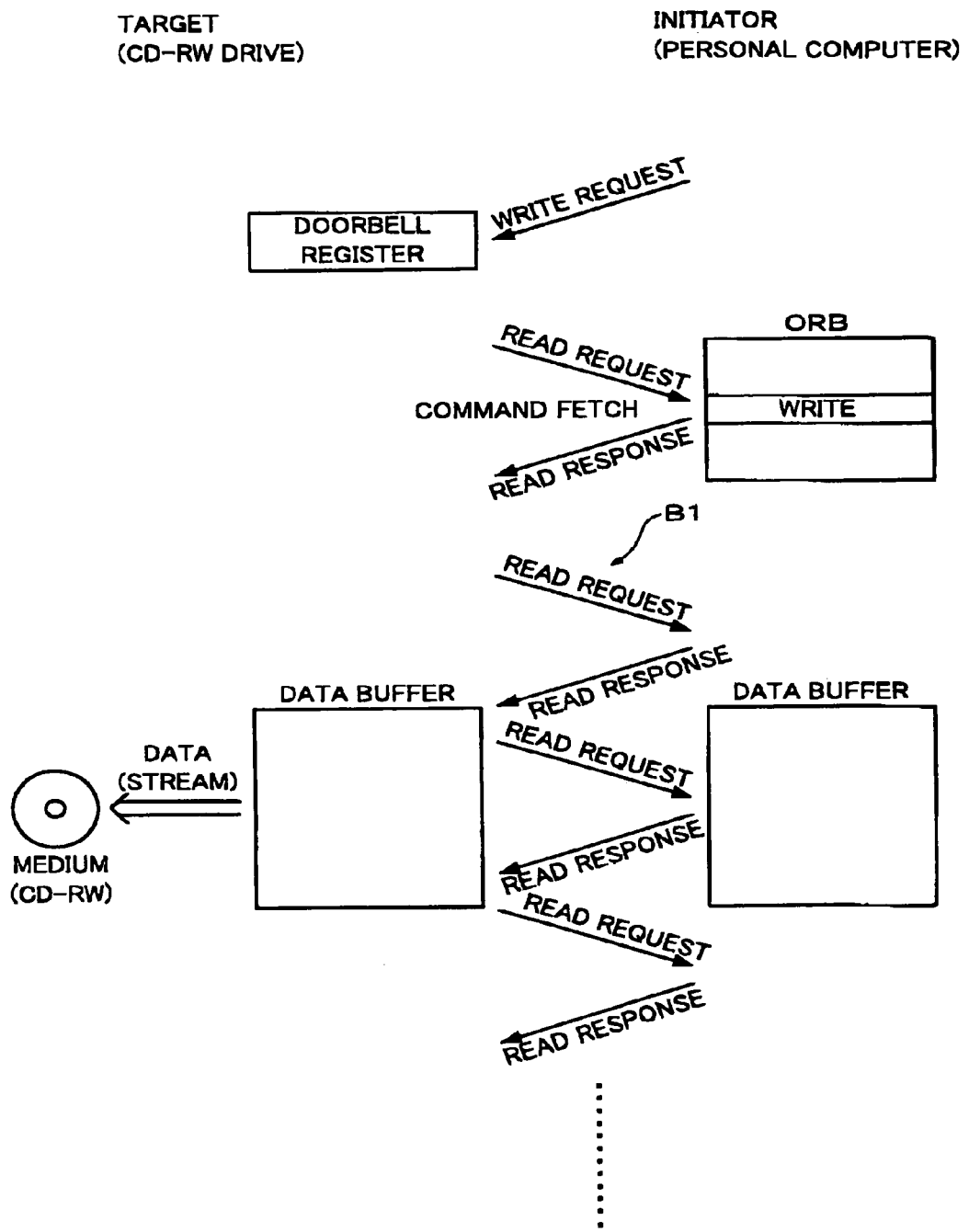

TARGET (SELF NODE)     INITIATOR (ANOTHER NODE)

WHEN A PAGE TABLE EXISTS

WHEN NO PAGE TABLE EXISTS

F I G. 1 1
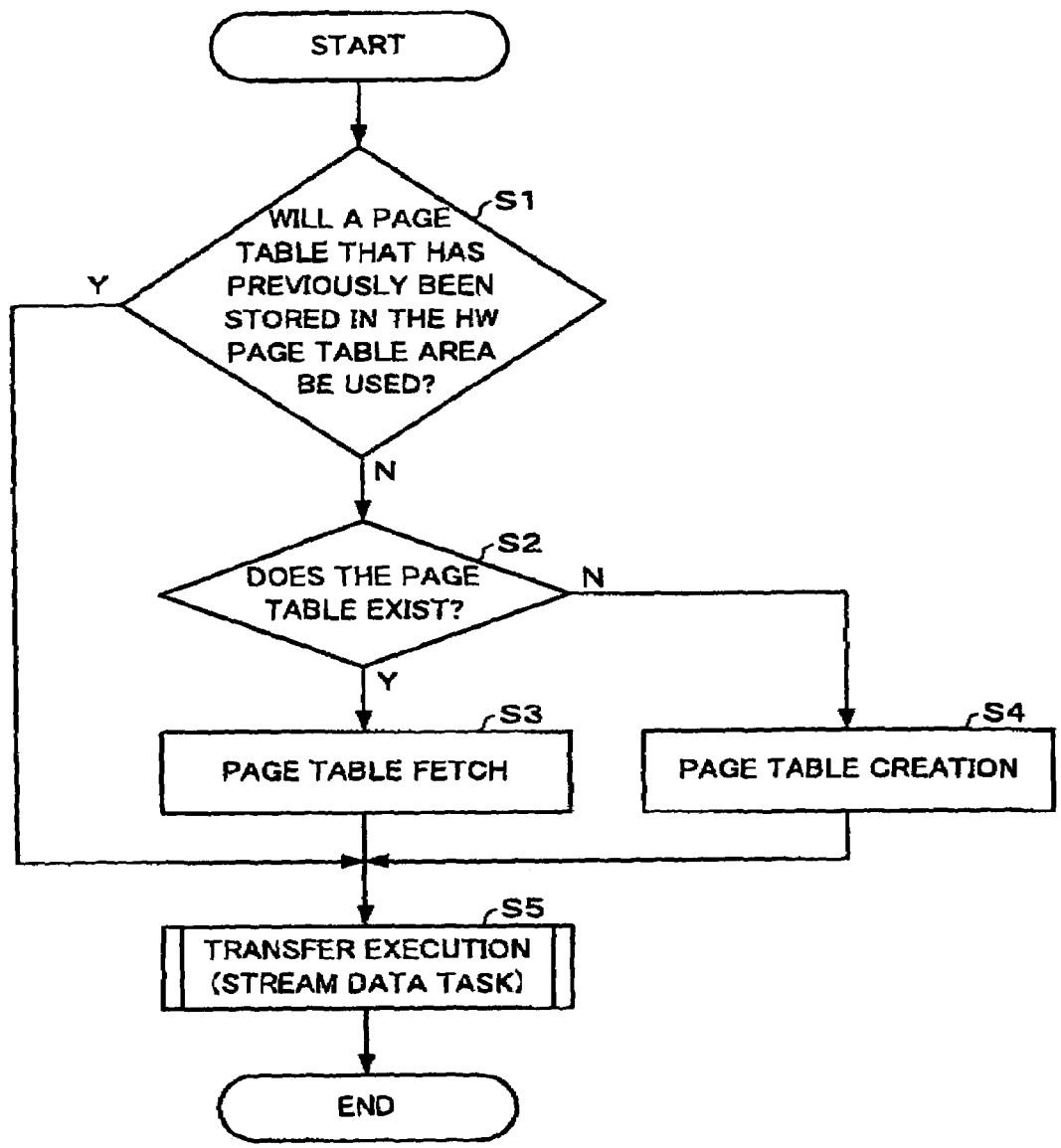

F I G. 13
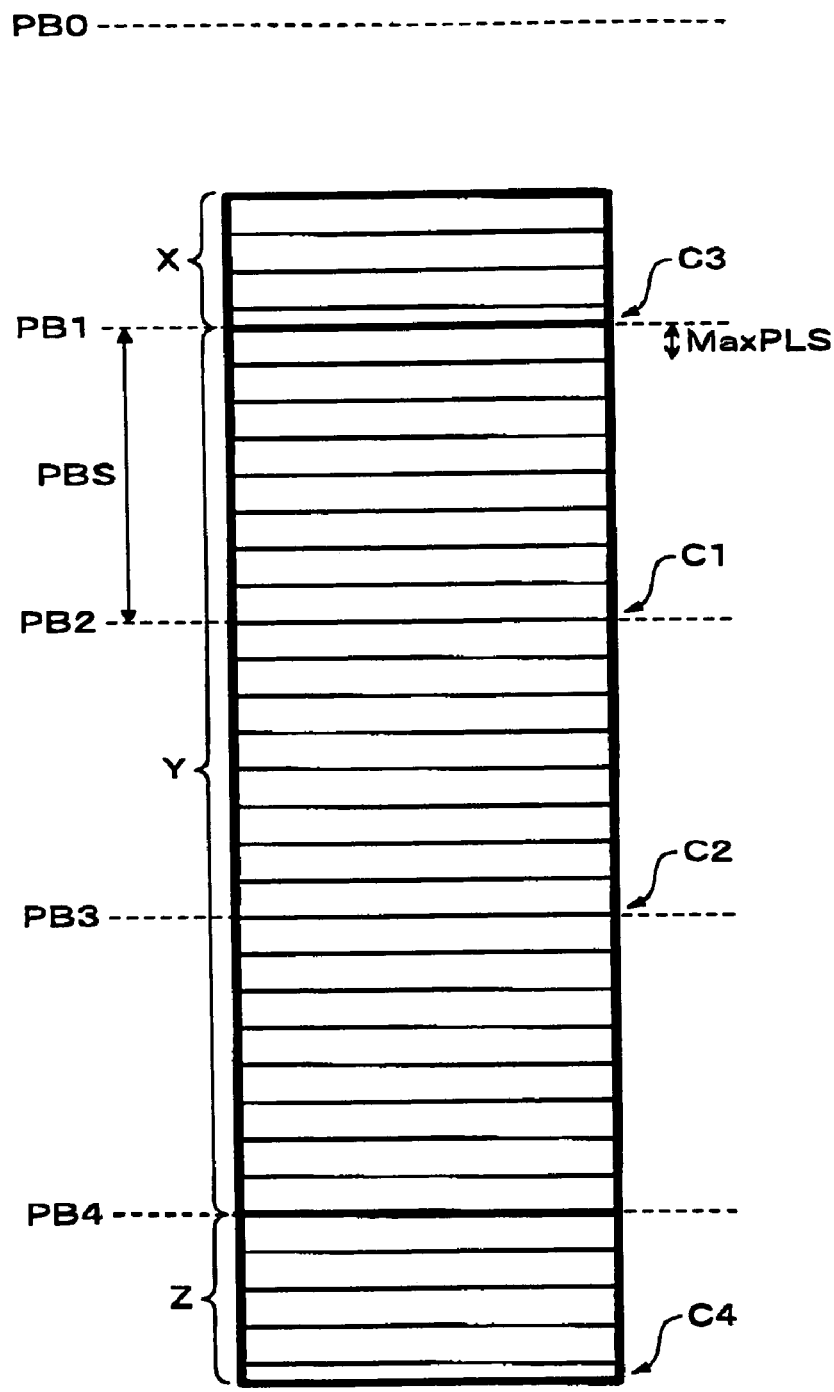

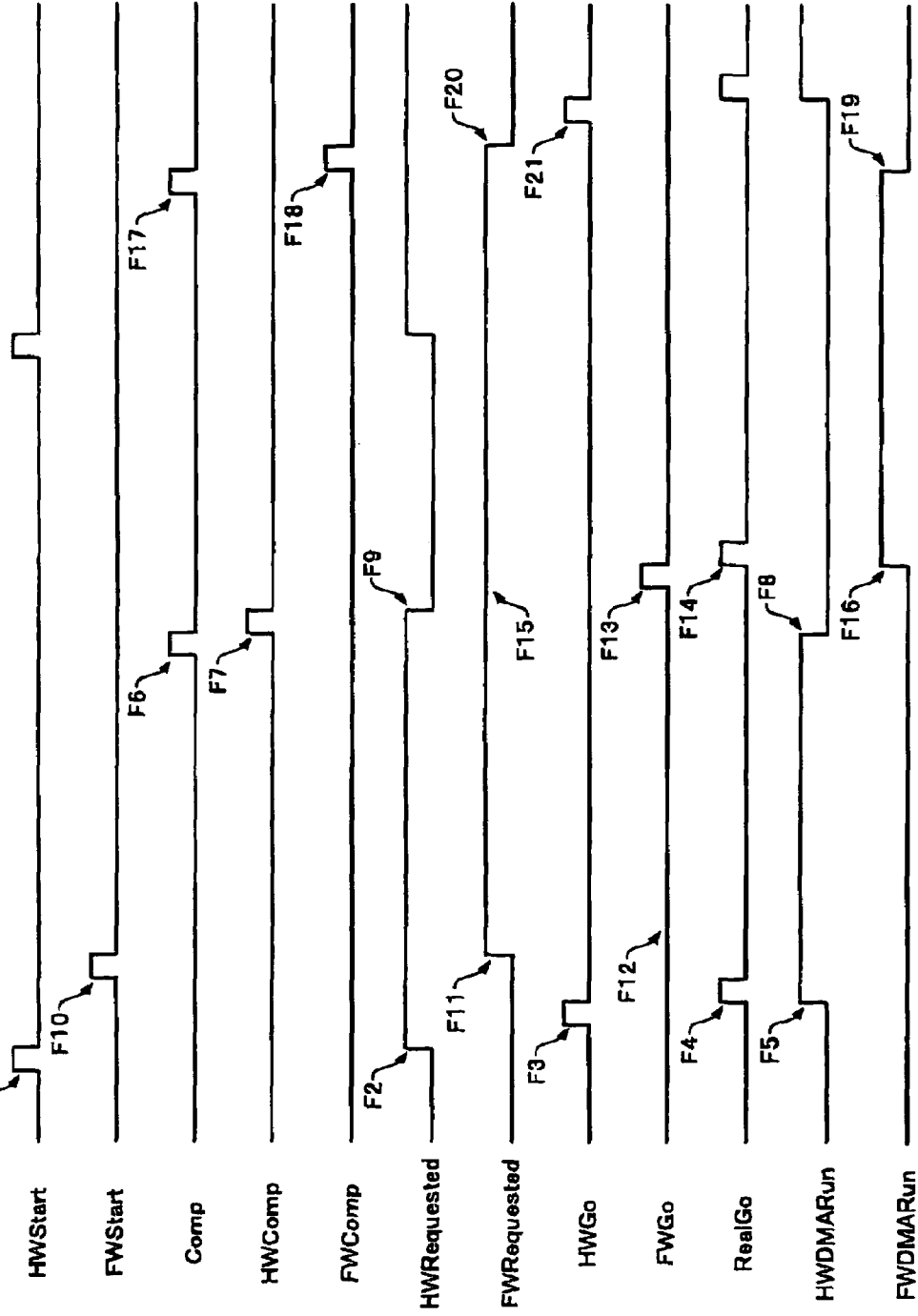

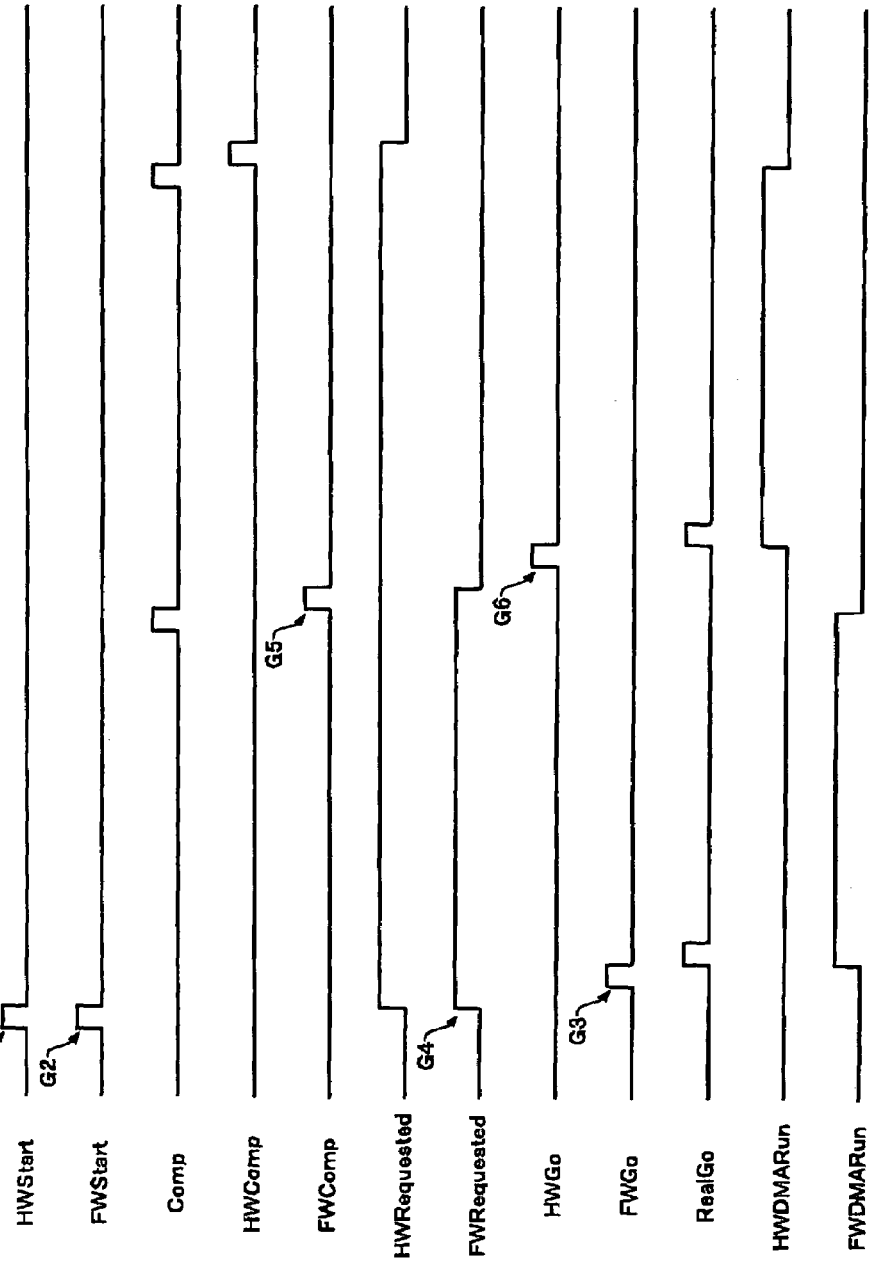

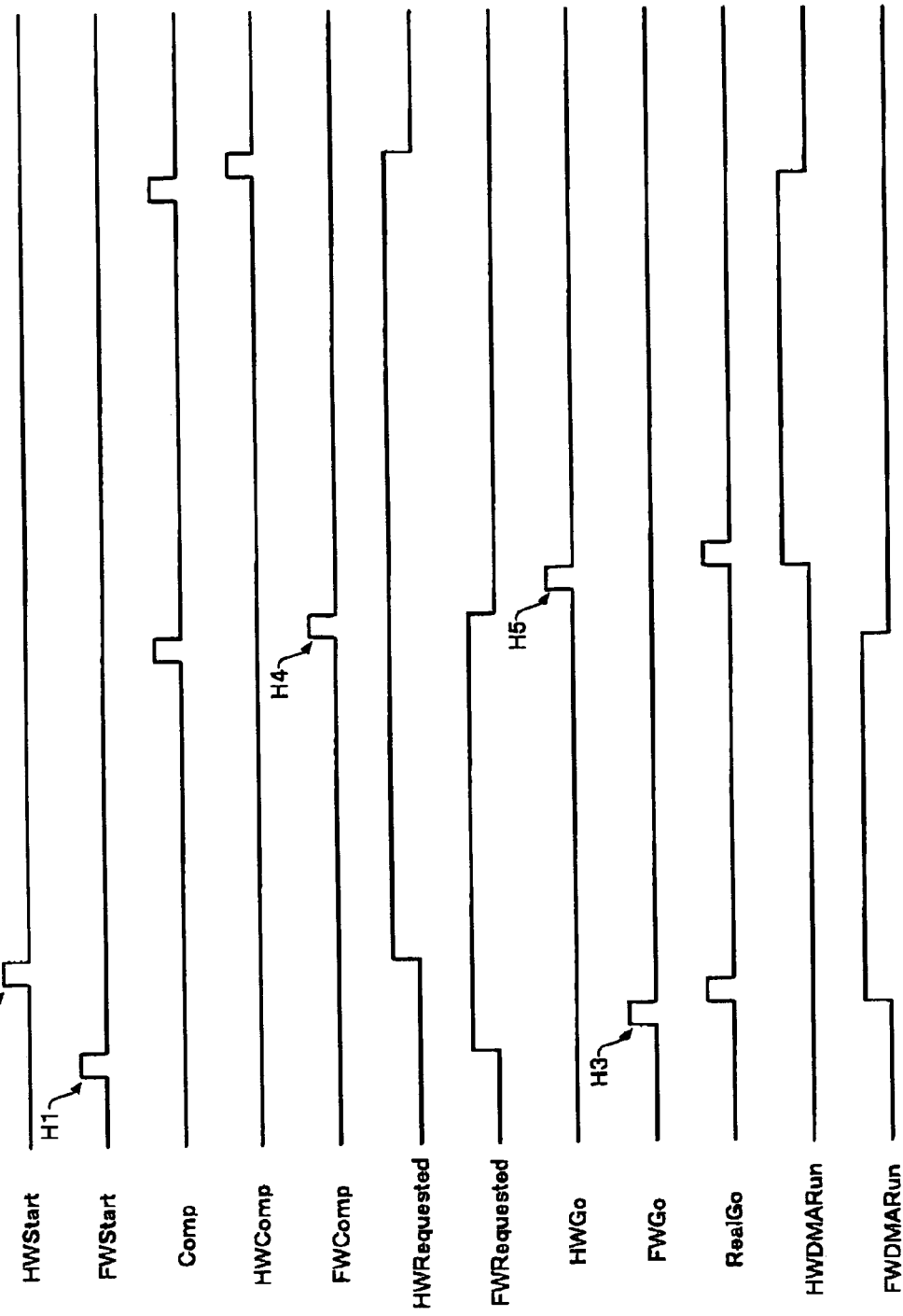

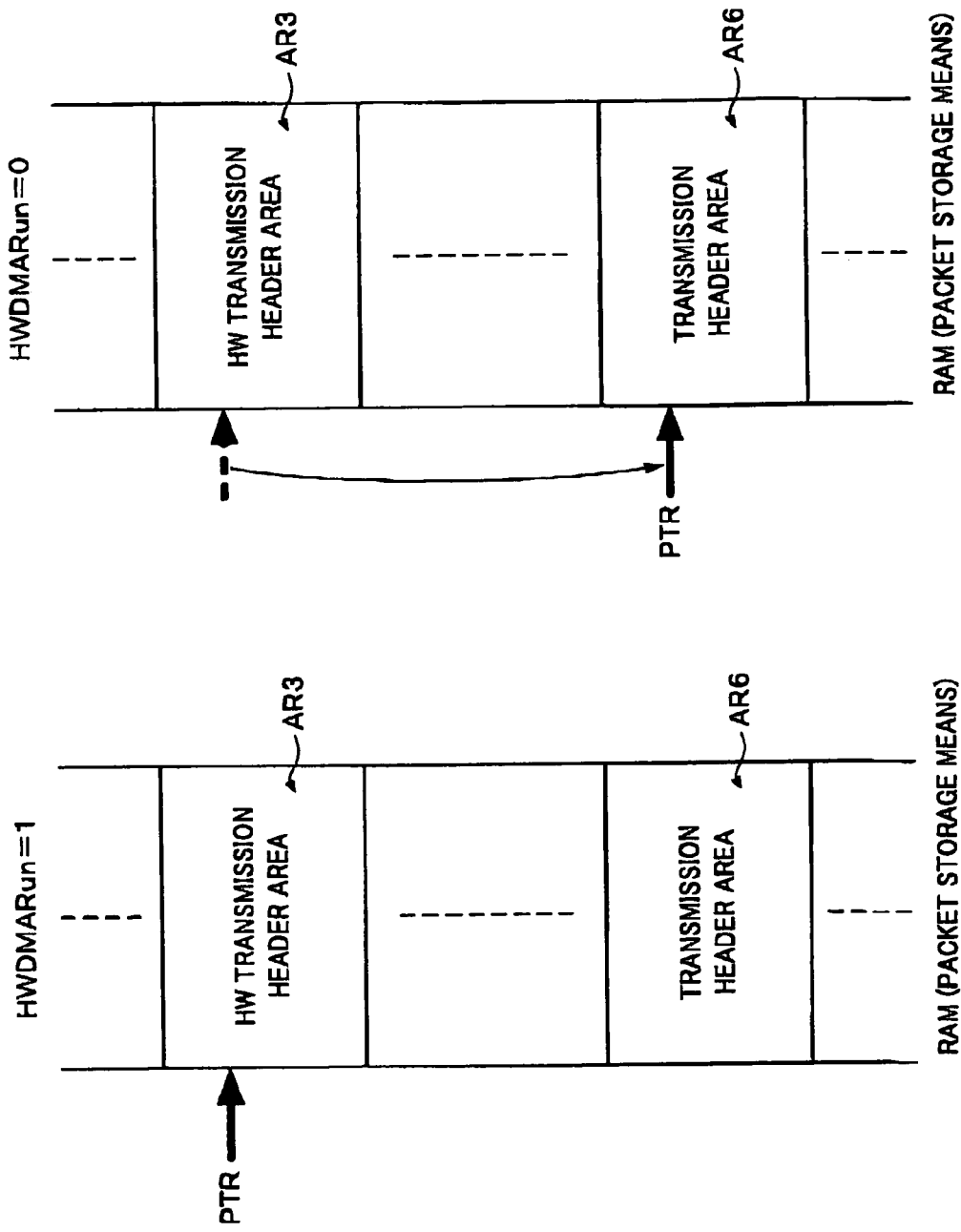

FIG. 25A
FIG. 25B
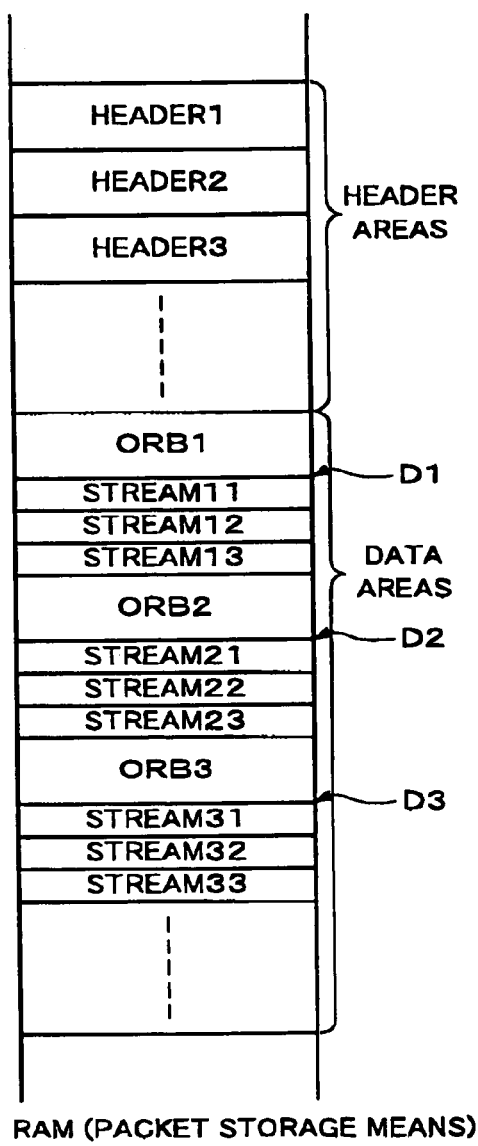
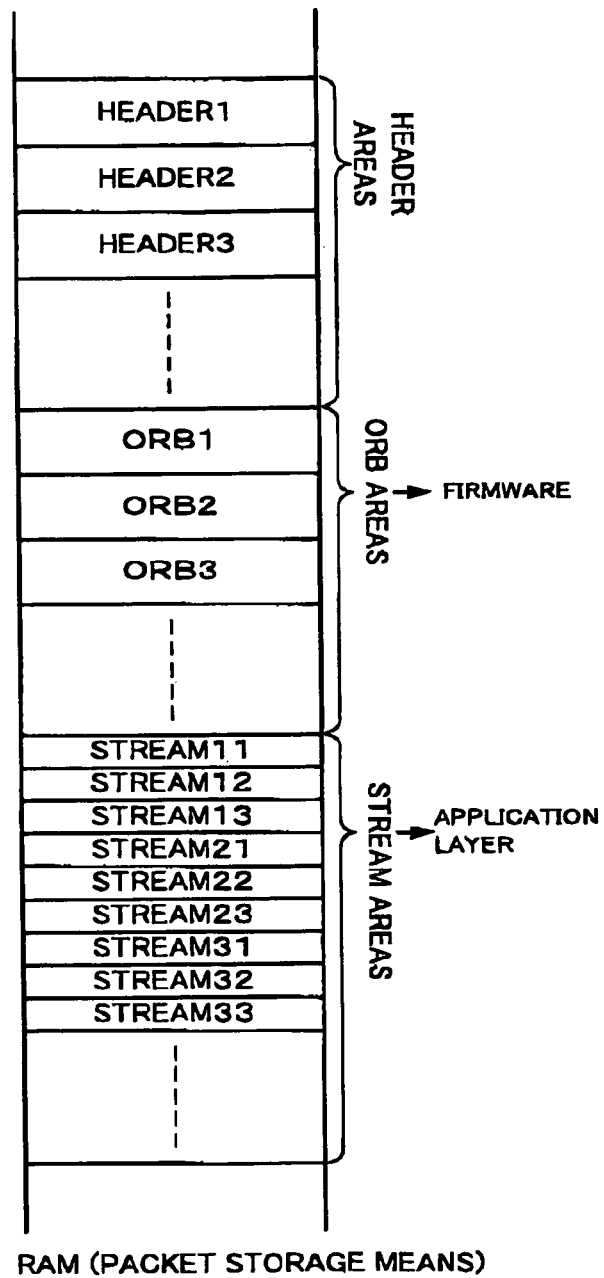

tl (TRANSACTION LABEL)

F I G. 28
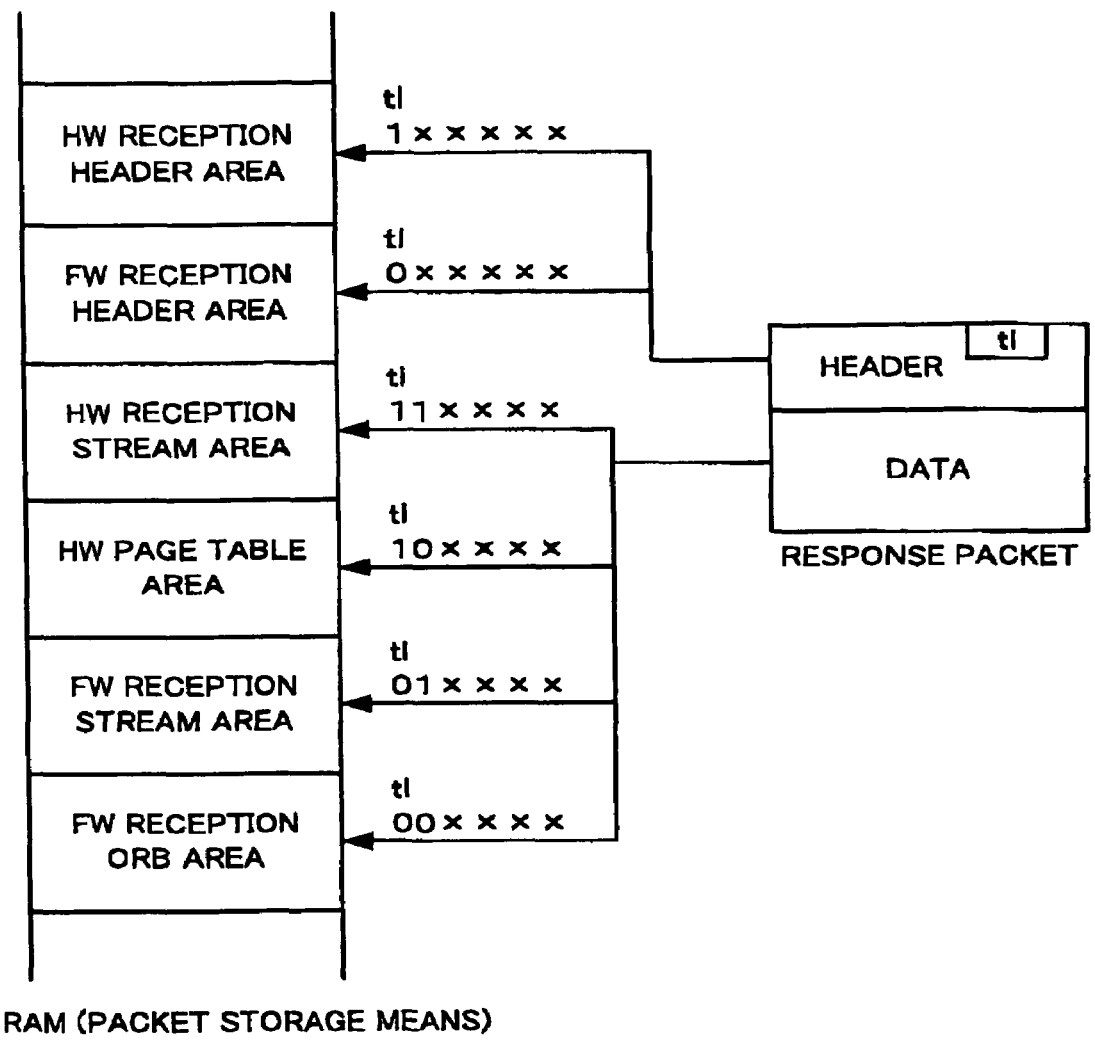

DATA TRANSFER CONTROL DEVICE AND ELECTRONIC EQUIPMENT

BACKGROUND OF THE INVENTION

1. Field of the Invention

The present invention relates to a data transfer control device and electronic equipment comprising the same, and, in particular, to a data transfer control device that enables data transfer in accordance with the IEEE 1394 standard or the like between a plurality of nodes connected to a bus, and electronic equipment comprising the same.

2. Description of Related Art

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners. CD-RW drives, and hard disk drives, but also to domestic appliances such as video cameras, VTRs, and TVs. This standard is therefore expected to enable a dramatic acceleration of the digitalization of electronic equipment.

Under this IEEE 1394, an event called a bus reset occurs if new electronic equipment is connected to the bus, electronic equipment is removed from the bus, or the number of nodes connected to the bus increases. When a bus reset occurs, the topology information relating to the nodes is cleared then this topology information is automatically set again. In other words, after a bus reset, tree identification (determination of the root node) and self identification are performed, then the nodes that are to act as management nodes, such as the isochronous resource manager, are determined. Ordinary packet transfer then starts.

However, some technical problems have been identified with such a data transfer control device conforming to IEEE 1394, as described below.

That is to say, the current IEEE 1394 standard does make it possible to implement transfer speeds up to a maximum of 400 Mbps. In practice, however, the presence of overhead processing forces the actual transfer speeds of the entire system to be much slower. In other words, the firmware and application software running on a CPU require large amounts of time for processes such as preparing for transmitting data, dividing transfer data into packets, and issuing the transfer start command, which means it is not possible to implement high-speed data transfer overall, no matter how fast the data can be transferred over the buses.

A particular problem lies in the fact that a CPU incorporated into peripheral equipment has a lower processing capability than the CPU incorporated into the host system, such as a personal computer. This makes the problem of overhead processing in the firmware and application software extremely serious. It is therefore desirable to provide techniques that are capable of efficiently solving this overhead problem.

SUMMARY OF THE INVENTION

The present invention was devised in the light of the above described technical problems, and has as an objective thereof the provision of a data transfer control device that can reduce the overhead processing of firmware or the like and implement high-speed data transfer within compact hardware, and electronic equipment using the same.

In order to solve the above described technical problems, according to a first aspect of the present invention, there is provided a data transfer control device for transferring data among a plurality of nodes that are connected to a bus. The data transfer control device comprises a transfer execution circuit that operates when a processing means has issued a first start command which instructs continuous packet transfer by hardware, for executing processing to divide transfer data into a series of packets and transfer the thus divided series of packets continuously; and an arbitration circuit that operates when the processing means has issued a second start command which instructs packet transfer while continuous packet transfer processing is being executed by the transfer execution circuit, for waiting until one transaction or one packet transfer in the continuous packet transfer has been completed then permitting packet transfer by the second start command.

If the processing means issues the first start command, the transfer data is divided into a plurality of packets by the hardware, for continuous transfer. It is therefore possible to greatly reduce the load on the processing means, since the processing means need only issue the first start command then wait for the completion of continuous packet transfer. Once this continuous packet transfer has started, a certain amount of wait time is required until the transfer of all the packets has been completed. It could therefore happen that problems will occur in packet transfer in accordance with the second start command, during the wait for the completion of the continuous packet transfer.

With this aspect of the invention, packet transfer in accordance with the second start command can interrupt the continuous packet transfer so that packet transfer in accordance with the second start command can be executed without waiting for the completion of the entire continuous packet transfer. This makes it possible to prevent the occurrence of the above described problem.

The transfer execution circuit may comprise at least one of: a page table fetch circuit that operates when a page table exists in a storage means of another node, to fetch the page table from the other node; a page table creation circuit that operates when no page table exists in the storage means of the other node, to create a virtual page table, based on page boundary information; a payload division circuit for dividing transfer data into packets of a payload size; a transfer execution control circuit for controlling the execution of data transfer; and a control information creation circuit for creating control information of a request packet to be sent to the other node. The inclusion of these circuit blocks makes it possible for the hardware to execute processing such as page table fetch or creation processing, packet payload division processing, processing for controlling the execution of data transfer, and processing for creating control information (such as headers) of request packets. This enables a huge reduction in the load on the processing means.

The arbitration circuit may receive a first start signal that goes active when there is a transfer start request from the transfer execution circuit, a second start signal that goes active when there is a transfer start request in accordance with the second start command, and a completion signal that goes active at transfer completion; then cause the start of transfer processing in accordance with the first start signal when the second start signal went active after the first start signal had gone active, and cause the start of transfer processing in accordance with the second start signal after the completion signal goes active. If the first start signal goes active before the second start signal, this configuration makes it possible to execute the transfer processing (transactions or packet transfers) in accordance with the first start signal, wait for the completion of that transfer processing, then execute the transfer processing in accordance with the second start signal.

The arbitration circuit may receive a first start signal that goes active when there is a transfer start request from the transfer execution circuit, a second start signal that goes active when there is a transfer start request in accordance with the second start command, and a completion signal that goes active at transfer completion; and give priority to transfer processing in accordance with the second start signal when the first and second start signals have gone active together. If a request packet is transmitted in from the other node, for example, this configuration makes it possible for the device to send back a response packet immediately, in answer to that request packet.

The arbitration circuit may receive a first start signal that goes active when there is a transfer start request from the transfer execution circuit, a second start signal that goes active when there is a transfer start request in accordance with the second start command, and a completion signal that goes active at transfer completion; then cause the start of transfer processing in accordance with the second start signal when the first start signal went active after the second start signal had gone active, and cause the start of transfer processing in accordance with the first start signal after the completion signal goes active. If the second start signal goes active before the first start signal, this configuration makes it possible to execute the transfer processing (transactions or packet transfers) in accordance with the second start signal, wait for the completion of that transfer processing, then execute the transfer processing in accordance with the first start signal.

The data transfer control device may further comprise: randomly accessible packet storage means having a control information area for storing packet control information and a data area for storing packet data; and an address generation circuit for generating a write address to the packet storage means, wherein the control information area of the packet storage means is separated into a first control information area and a second control information area, control information of the second control information area being written by the transfer execution circuit; and wherein the address generation circuit switches between generating addresses for the first control information area and addresses for the second control information area, based on an arbitration result from the arbitration circuit. This configuration makes it possible to use a simple process to switch the generating of addresses between the first and second control information areas. The enabling of such address switching makes it possible to simplify the processing of creating and writing control information by the hardware, so that control information created by the transfer execution circuit can be written sequentially to the second control information area.

The data transfer control device may further comprise: randomly accessible packet storage means having a control information area for storing packet control information and a data area for storing packet data, wherein the data area of the packet storage means is separated into a first data area for storing first data for a first layer and a second data area for storing second data for a second layer that is the object of continuous packet transfer by the transfer execution circuit. This ensures that packet control information (such as headers and footers) is stored in a control information area, first data of the packet (such as data for the transaction layer) is stored in a first data area, and second data of the packet (such as data for the application layer) is stored in a second data area. This configuration makes it possible to read the second data out sequentially from the second data area and transfer it to the second layer. This makes it possible to transfer data even faster.

Note that the first data in accordance with the present invention is preferably command data used by the protocol of the first layer and the second data is preferably data used by the application layer.

When a request packet for starting a transaction is transmitted to another node, instruction information for instructing the processing to be performed when a response packet will be received from the other node may be comprised within transaction identification information in the request packet; and when a response packet is received from the other node, control information and first and second data of the response packer may respectively be written to the control information area and the first and second data areas, based on the instruction information comprised within the transaction identification information in the response packet. This makes it possible to greatly reduce the processing load on the processing means.

The data transfer according to this invention may be performed in accordance with the IEEE 1394 standard.

According to a second aspect of the present invention, there is provided electronic equipment comprising: any one of above described data transfer control devices; a device for performing given processing on data that has been received from another node via the data transfer control device and the bus; and a device for outputting or storing data that has been subjected to the processing. According to a third aspect of the present invention, there is also provided electronic equipment comprising: any one of the above described data transfer control devices; a device for performing given processing on data that is to be transferred to another node via the data transfer control device and the bus; and a device for fetching data to be subjected to the processing.

With these aspects of the invention, it is possible to speed up the processing performed within the electronic equipment for outputting or storing data that has been transferred from another node, or the processing performed within the electronic equipment on data that has been fetched thereby and is to be transferred to another node. These aspects of the invention also make it possible to make the data transfer control device more compact and also reduce the processing loads on firmware or the like that controls the data transfer, thus making it possible to produce electronic equipment that is less expensive and more compact.

BRIEF DESCRIPTION OF THE DRAWINGS

FIG. 5 illustrates command processing when data (a data stream) is transferred from an initiator to a target.

FIG. 11 is a flowchart illustrating the operation of the main control circuit.

FIG. 13 illustrates the payload division technique.

FIG. 21 is a timing waveform chart of the processing when the HWStart signal goes active before the FWStart signal.

FIG. 22 is a timing waveform chart of the processing when the HWStart and FWStart signals go active simultaneously.

FIG. 23 is a timing waveform chart of the processing when the FWStart signal goes active before the HWStart signal.

FIG. 24 illustrates the technique of switching between generating addresses for the HW header areas and for the ordinary header areas, based on the HWDMARun signal from the arbitration circuit.

FIGS. 25A and 25B illustrate techniques of separating the data areas into ORB areas and stream areas.

FIG. 28 illustrates a technique of writing a header and data of a packet to different areas in RAM, using the transaction label.

DETAILED DESCRIPTION OF PREFERRED EMBODIMENTS

Preferred embodiments of this invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
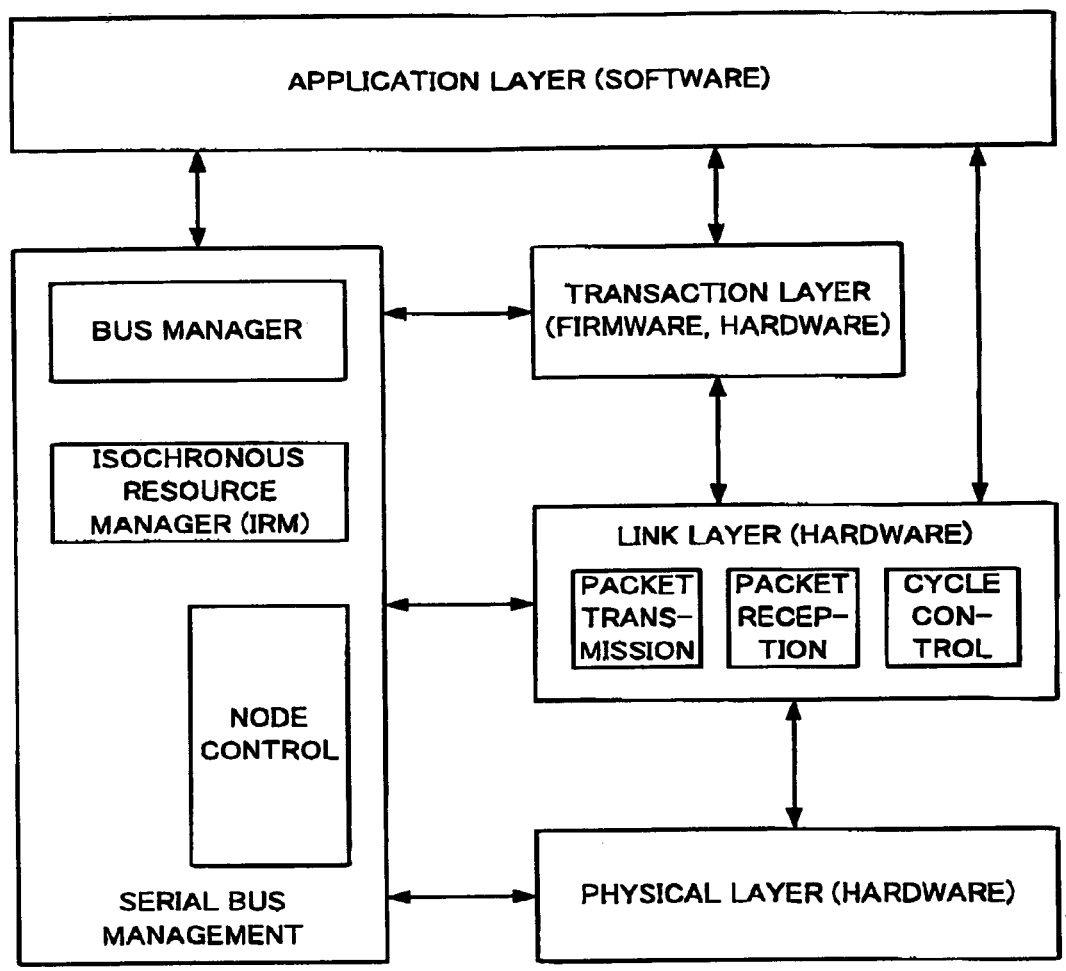
FIG. 1 shows the layer structure of IEEE 1394.

The layer structure (protocol structure) covered by IEEE 1394 is shown in FIG. 1.

The IEEE 1394 protocol comprises a physical layer, a link layer, and a transaction layer. The serial bus management monitors and controls the physical layer, link layer, and transaction layer, and provides various functions for controlling nodes and managing bus resources.

The transaction layer provides an interface (service) for upper layers at each transaction and executes transactions such as read transactions, write transactions, and lock transactions through the interface provided by the lower link layer.

In this case, a read transaction causes data to be transmitted from the responding node to the node that requested the data. Similarly, a write transaction causes data to be transmitted from the request node to the responding node. A lock transaction causes data to be transmitted from the request node to the responding node, and the responding node then processes that data and returns it to the request node.

The link layer provides functions such as addressing, data check, data framing for packet transmission/reception, and cycle control for isochronous transfer.

The physical layer converts the logical symbols used by the link layer into electrical signals, performs bus arbitration, and defines the physical bus interface.

1.3 SBP-2

Figure 2:
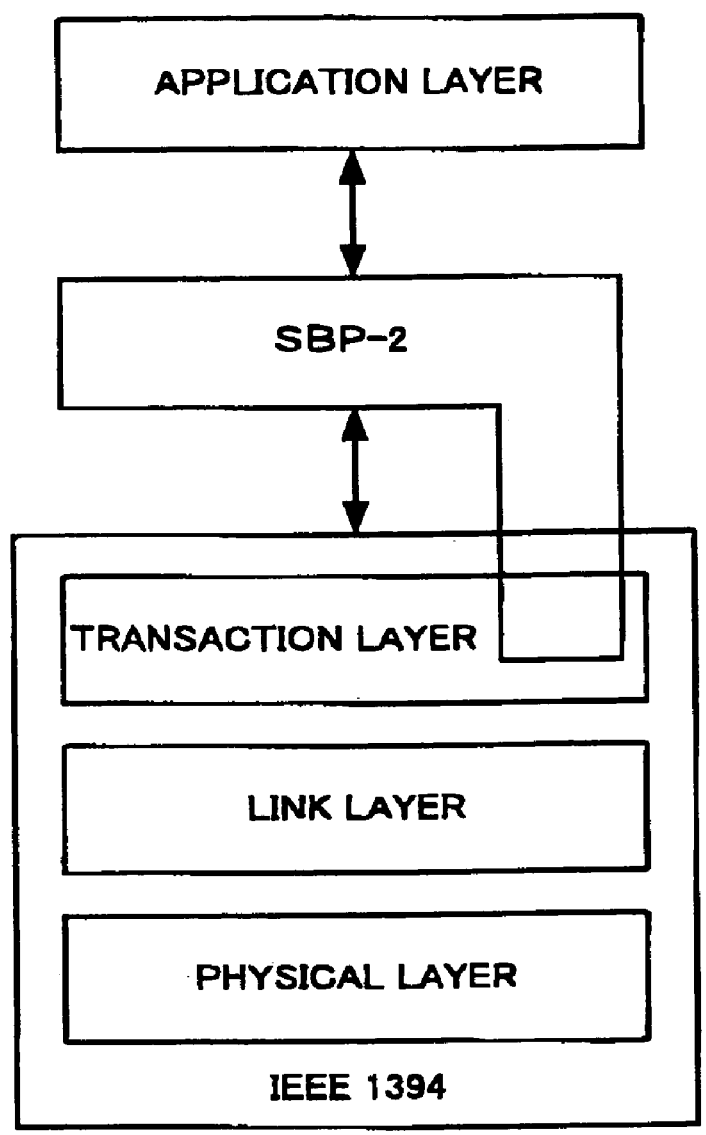
FIG. 2 illustrates the SBP-2.

A protocol called the serial bus protocol 2 (SBP-2) has been proposed as a higher-order protocol that comprises some of the functions of the transaction layer under IEEE 1394, as shown in FIG. 2.

In this case, SBP-2 is proposed in order to enable utilization of the SCSI command set on the IEEE 1394 protocol. Use of this SBP-2 minimizes the changes to be made to the SCSI command set that is used in electronic equipment that conforms to the existing SCSI standards, but enables use in electronic equipment that conforms to the IEEE 1394 standard. The design and development of electronic equipment can be simplified thereby. Since it is also possible to encapsulate device-specific commands, not just SCSI commands, this increases the universality of the command set.

Figure 3:
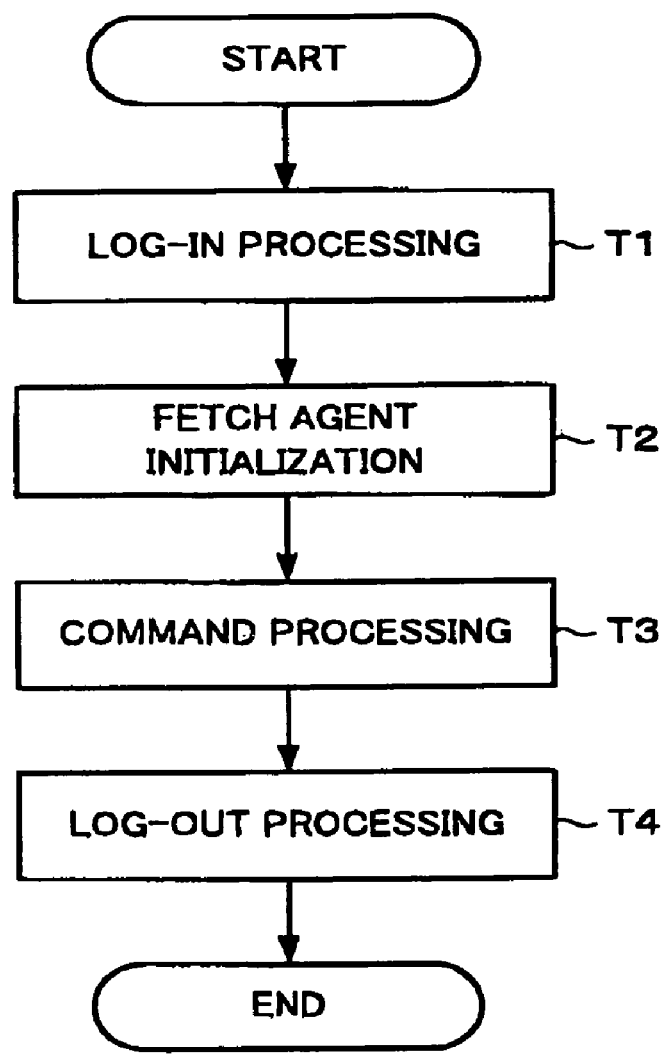
FIG. 3 illustrates the concept of data transfer processing under SBP-2.

With SBP-2, log-in processing is done by first using a log-in operation request block (ORB) created by an initiator (such as a personal computer), as shown in FIG. 3 (step T1). A dummy ORB is then used to initialize a fetch agent (step T2). A command is executed by using a normal command ORB (step T3), and finally log-out processing is done by a log-out ORB (step T4).

Figure 4:
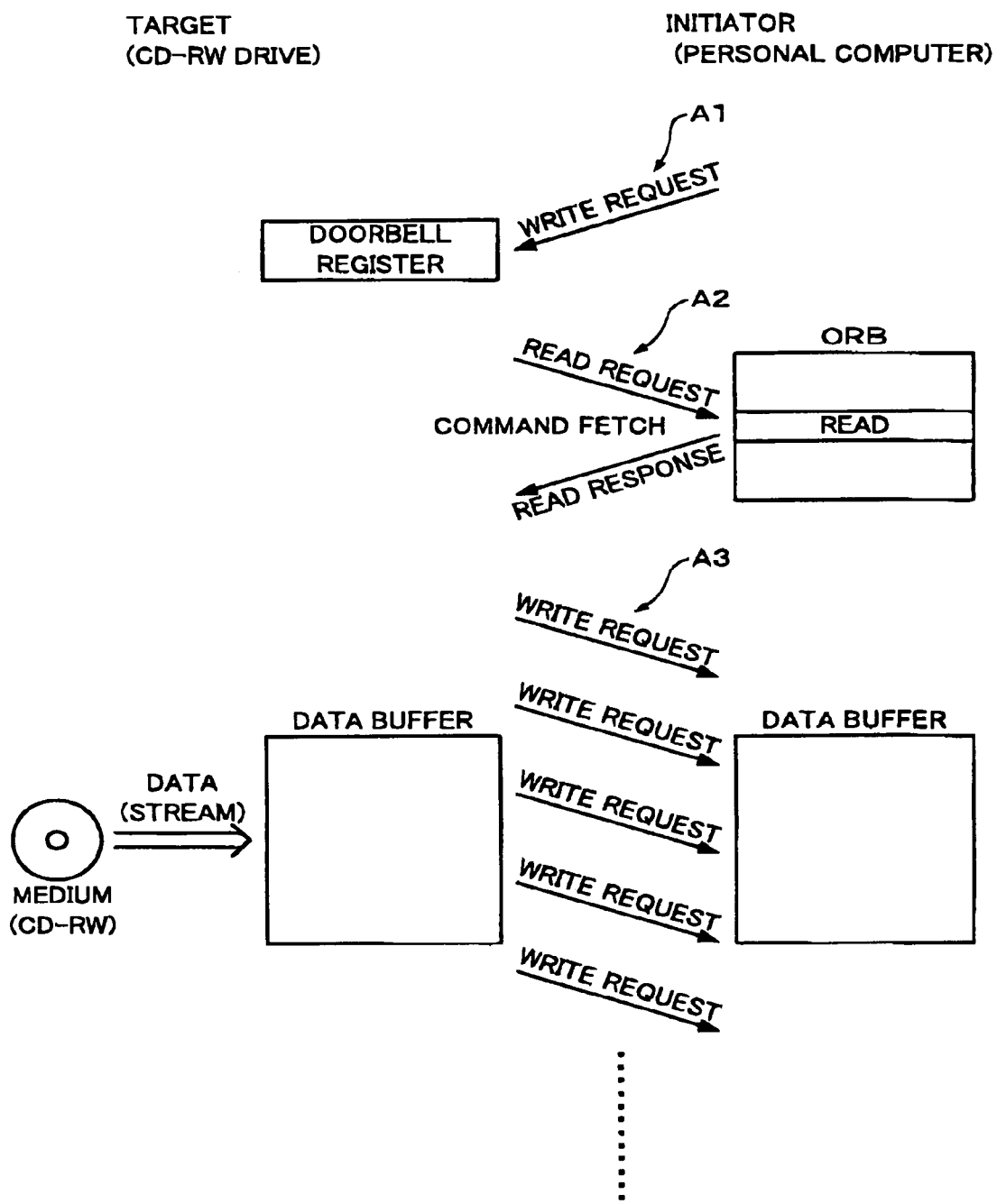
FIG. 4 illustrates command processing when data (a data stream) is transferred from a target to an initiator.

During the command processing of step T3, the initiator transmits a write request packet (executes a write request transaction) to ring a doorbell register of the target, as shown at A1 in FIG. 4. When that happens, the target transmits a read request packet and the initiator returns a read response packet, as shown at A2. This causes the ORB created by the initiator (a normal command ORB) to be fetched into a data buffer at the target. The target analyzes any commands comprised within the fetched ORB.

If a command comprised within the ORB is a SCSI read command, the target transmits a series of write request packets to the initiator, as shown at A3. This causes the transmission of data, such as data (a data stream) that has been read out from a medium (CD-RW) at the target, to a data buffer in the initiator.

If a command comprised within the ORB is a SCSI write command, on the other hand, the target transmits a read request packet to the initiator and the initiator returns the corresponding read response packet, as shown at B1 in FIG. 5. This causes the data (a data stream) that is stored in a data buffer of the initiator to be transmitted to the target, than written to a medium at the target (or printed, if the target is a printer).

With this SBP-2, the target can transmit a request packet (execute a transaction) and send or receive data when its own circumstances allow. Since it is therefore not necessary for the initiator and the target to operate simultaneously, the efficiency of data transfer can be increased.

Note that protocols other than SBP-2 are also being proposed as protocols of a higher order than IEEE 1394, such as the function control protocol (FCP).

Figure 6A:
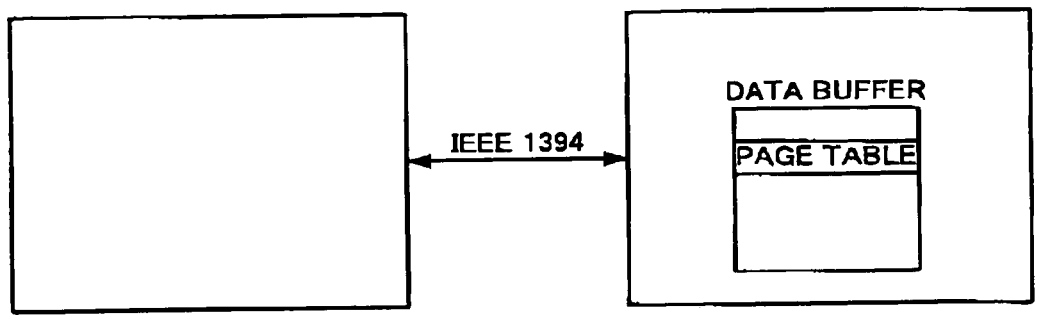
FIGS. 6A, 6B, and 6C illustrate page tables.

When data is to be transferred between the target and the initiator, the sequence depends on whether a page table exists in a data buffer (storage means) at the initiator (another node) as shown in FIG. 6A, or whether no such table exists.

Figure 6B:
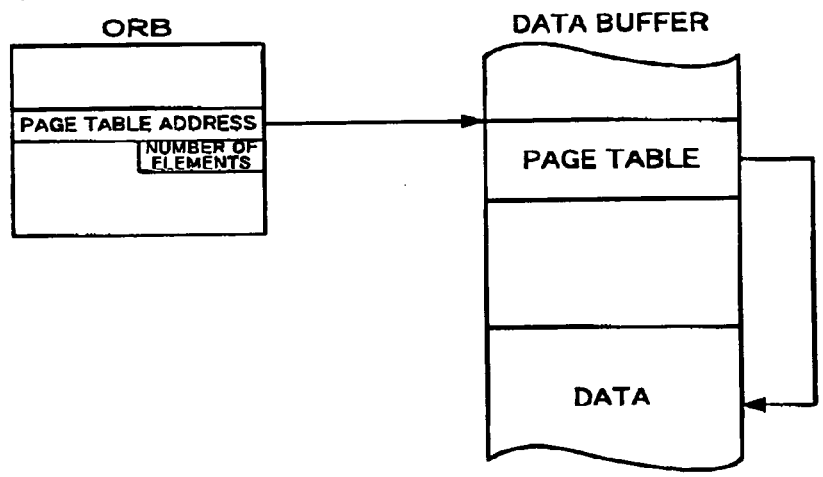

If a page table exists, the address of that page table and the number of elements therein is comprised within the ORB created by the initiator, as shown in FIG. 6B. The address of the transfer data (the read address or write address thereof) is specified as an indirect address using that page table.

Figure 6C:
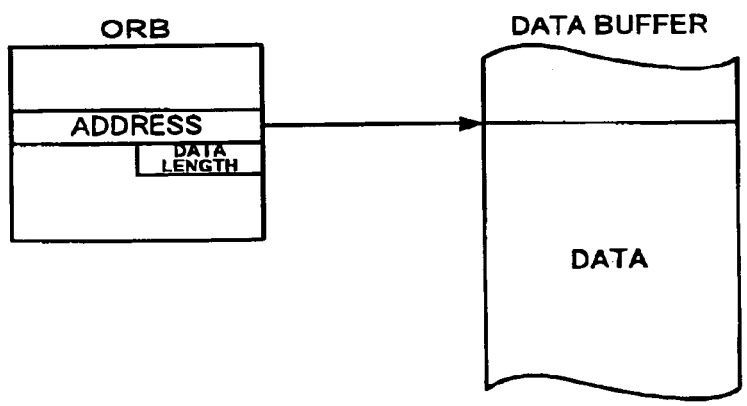

If no such table exists, on the other hand, an address and data length are comprised within the ORB, as shown in FIG. 6C, so that the address of the transfer data is specified as a direct address.

2. Overall Configuration

The overall configuration of this embodiment of the invention is described below, with reference to FIG. 7.

Figure 7:
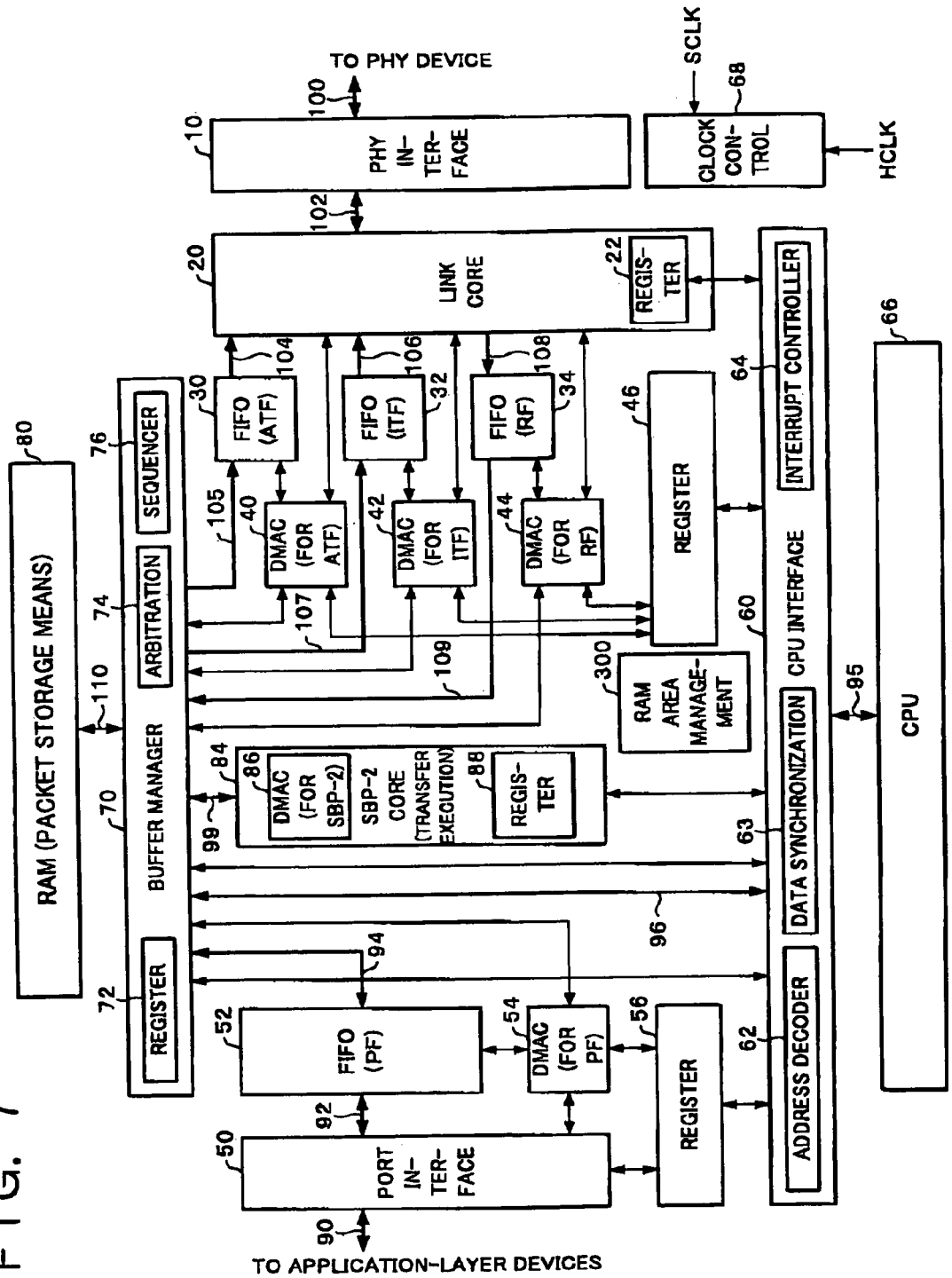
FIG. 7 shows an example of the configuration of a data transfer control device in accordance with an embodiment of this invention.

In FIG. 7, a PHY interface 10 is a circuit that provides an interface with a PHY device (a physical layer device).

A link core 20 (link means) is a circuit implemented in hardware that provides part of the link layer protocol and the transaction layer protocol; it provides various services relating to packet transfer between nodes. A register 22 is provided to control the link core 20.

A FIFO (asynchronous transmission FIFO) 30, a FIFO (isochronous transmission FIFO) 32, and a FIFO (reception FIFO) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

A DMAC 40 (read means), a DMAC 42 (read means), and a DMAC 44 (write means) are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as printer drivers, by way of example).

A FIFO (PF) 52 is a FIFO used for transferring data to and from an application-layer device and a DMAC 54 is a DMA controller for PF. A register 56 provides control over the port interface 50 and the DMAC 54.

An SBP-2 core 84 (transfer execution circuit) is a circuit that implements parts of the SBP-2 protocol and part of the transaction layer by hardware. The functions of this SBP-2 core 84 make it possible to divide transfer data into a series of packets then transfer the thus-divided series of packets continuously. Note that a register 88 is used to provided control over the SBP-2 core 84 and a DMAC (for SBP-2) 86 is a DMA controller for the SBP-2 core 84.

A RAM area management circuit 300 is a circuit for managing the various areas within the RAM 80. When each of the areas within the RAM 80 becomes full or empty, the RAM area management circuit 300 uses various full or empty signals to control the DMACs 40, 42, 44, 54, and 86.

A CPU interface 60 provides an interface with the CPU 66 (processing means) that controls the data transfer control device. The CPU interface 60 comprises an address decoder 62, a data synchronization circuit 63, and an interrupt controller 64. A clock control circuit 68 controls the clock signals used by this embodiment, and SCLK (the system clock for the data transfer control device) that is sent from the PHY device (PHY chip) and HCLK (the operating clock of the CPU 66) are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM. SDRAM, or DRAM or the like.

Note that the RAM 80 is preferably accommodated within the data transfer control device of this embodiment. However, it is possible to attach part or all of the RAM 80 externally.

Figure 8:
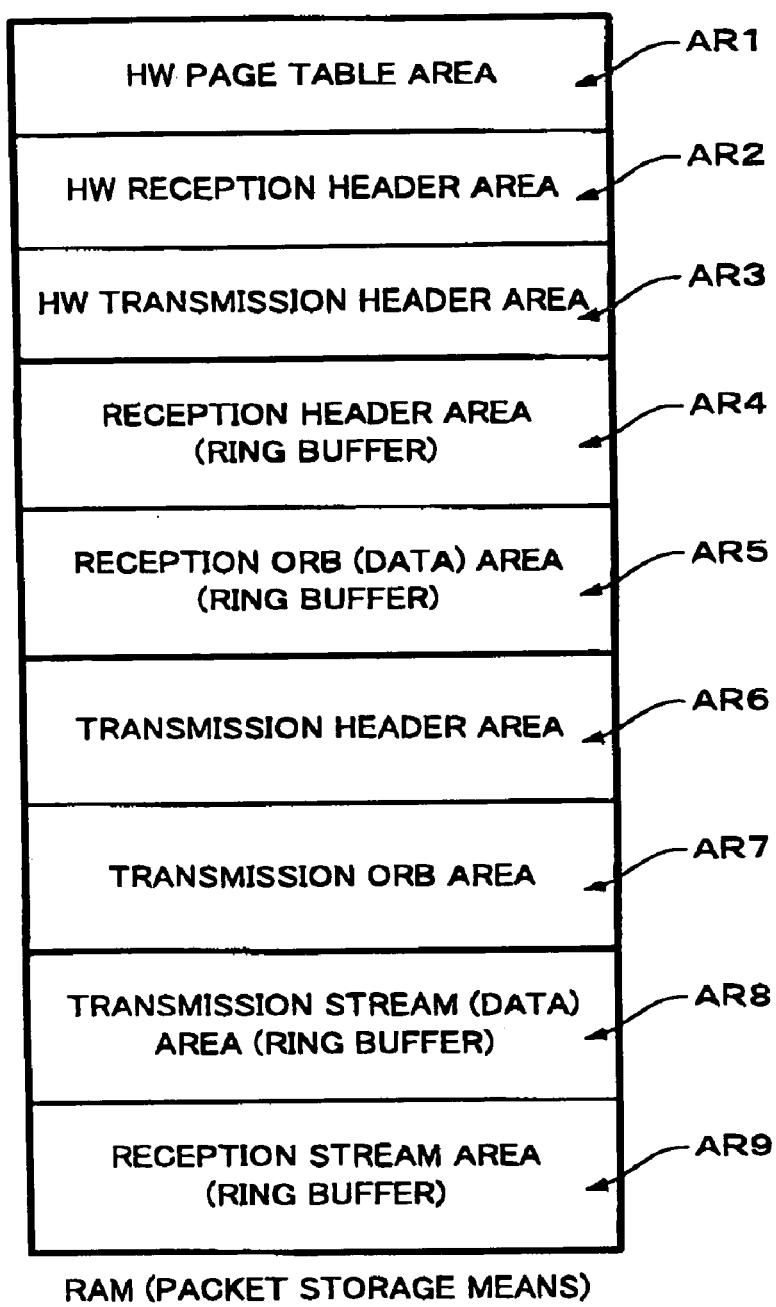
FIG. 8 illustrates a technique of separating (dividing) within a RAM (packet storage means).

An example of the memory map of the RAM 80 is shown in FIG. 8. In this embodiment of the invention as shown in FIG. 8, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9).

In addition, the RAM 80 in this embodiment is divided into reception areas (AR2, AR4, AR5, and AR9) and transmission areas (AR3, AR6, AR7, and AR8).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 7 for writing and reading the page table, reception header, and transmission header.

Note that the areas denoted by AR4, AR5, AR8, and AR9 in FIG. 8 form a structure called a ring buffer.

A bus 90 (or buses 92 and 94) shown in FIG. 7 is for connections to applications (a first bus). Another bus 95 (or bus 96), which is for controlling the data transfer control device or for reading and writing data, is connected electrically to a device (such as a CPU) that controls the data transfer control device, as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAM 80.

Figure 9:
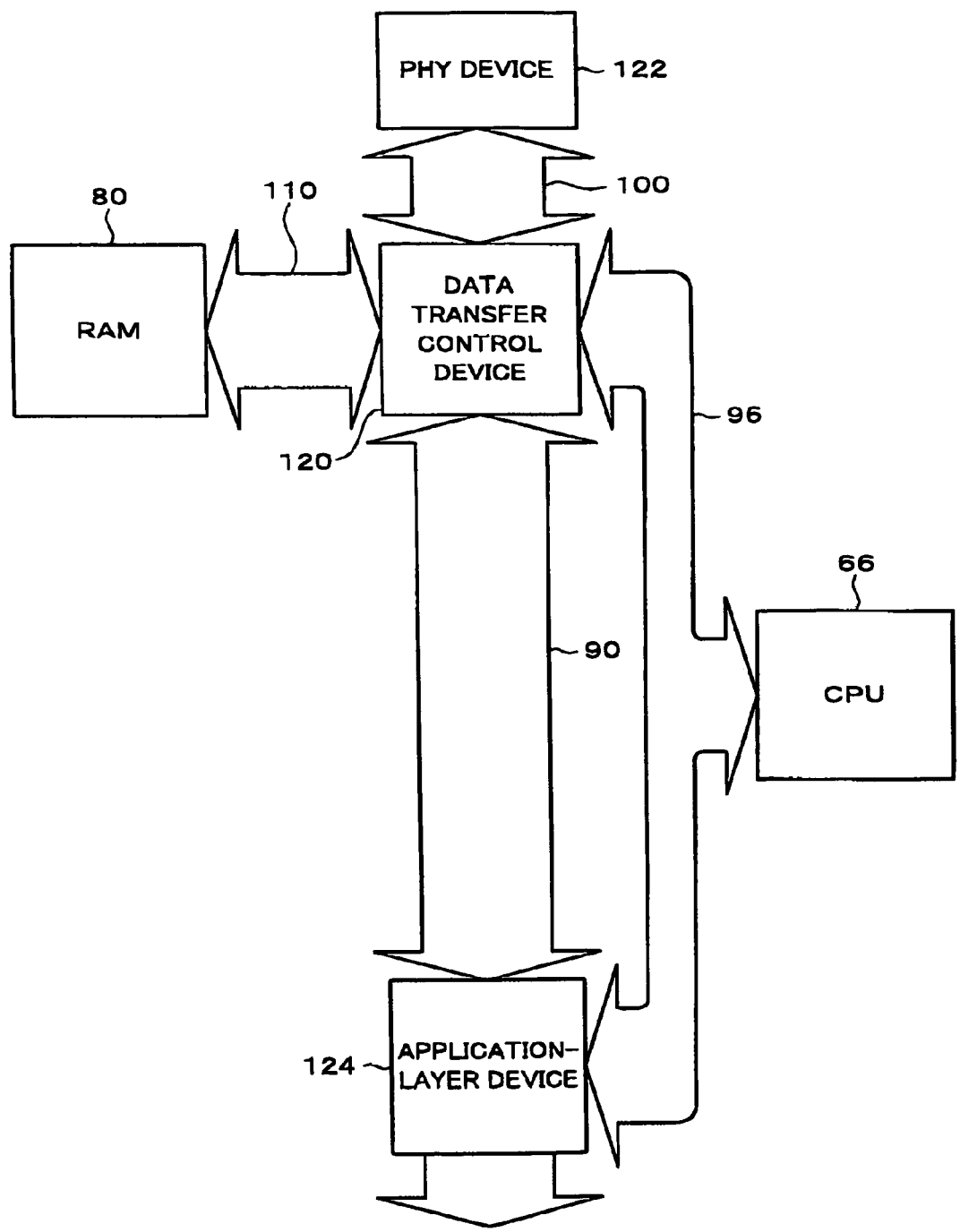
FIG. 9 illustrates a data transfer technique in accordance with this embodiment of the invention.

This configuration makes it possible to separate the bus 90 between a data transfer control device 120 and an application-layer device 124; the CPU bus 96; and the bus 110 between the data transfer control device 120 and the RAM 80, as shown in FIG. 9. The CPU bus 96 can therefore be used solely for controlling data transfer. In addition, the bus 90 is dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Configuration of SBP-2 Core (Transfer Execution Circuit)

Figure 10:
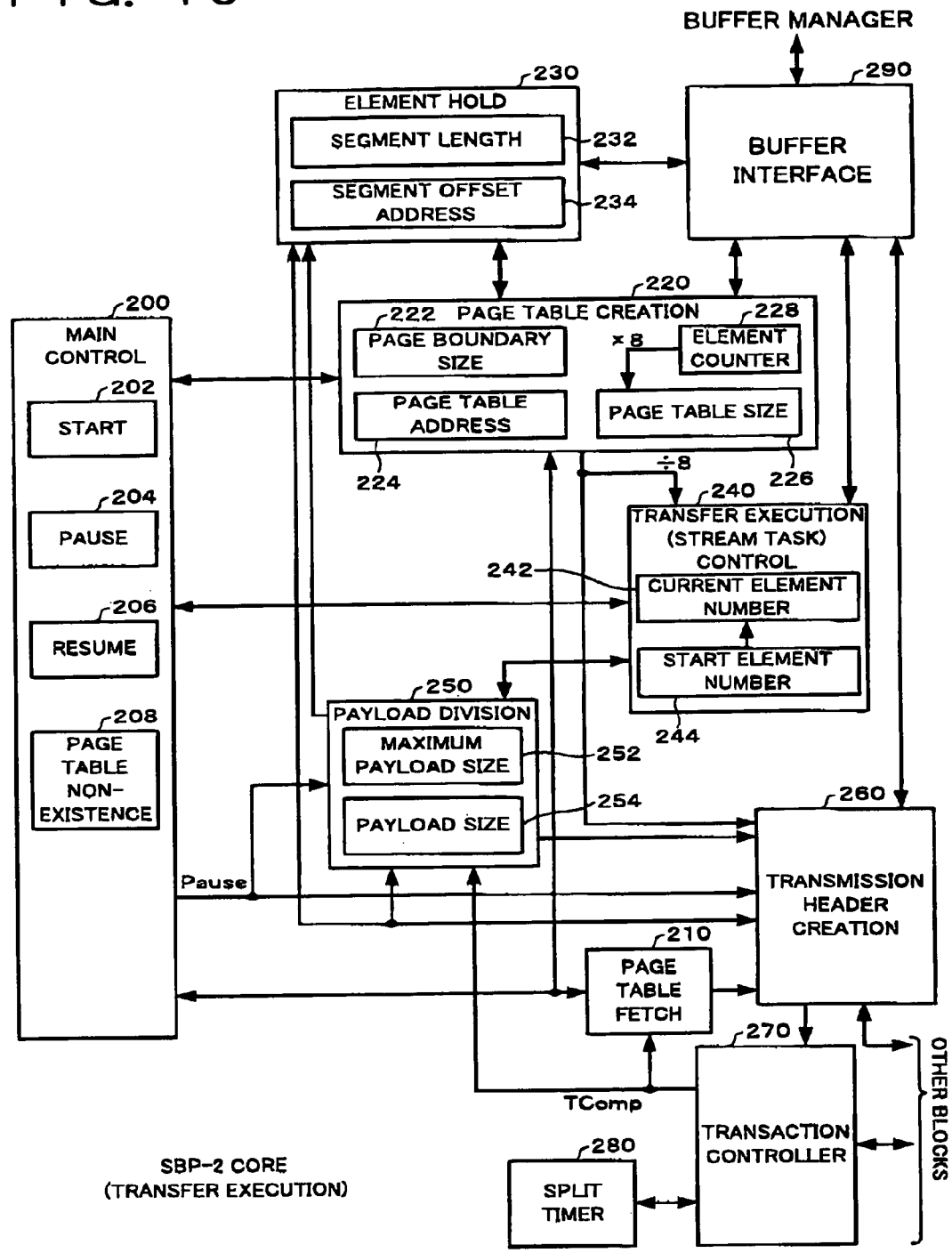
FIG. 10 shows an example of the configuration of the SBP-2 core (transfer execution circuit).

An example of the structure of the SBP-2 core 84 of FIG. 7 is shown in FIG. 10. The SBP-2 core 84 automatically divides transfer data into a series of packets then transfers the series of divided packets continuously. It mainly implements the packet transfer shown at A3 in FIG. 4 and B1 in FIG. 5 by hardware.

A main control circuit 200 is a circuit for providing control over the entire SBP-2 core 84, and it comprises registers 202, 204, 206, and 208.

In this case, the registers 202, 204, and 206 are used by the firmware (CPU) for issuing a start command, pause command, and a resume command, for data transfer (hardware SBP-2 processing). In other words, if the firmware writes 1 to the register 202, this starts processing to divide the transfer data into a series of packets and transfer them continuously. If the firmware writes 1 to the register 204 during this transfer processing, the data transfer is paused; if it writes 1 to the register 206, the paused data transfer starts again.

A register 208 is used for specifying whether or not a page table exists. That is to say, if the firmware has analyzed the ORB from the initiator and has determined that no page table exists in the data buffer of the initiator, 1 is written to the register 208. If the presence of a page table is determined, on the other hand (the case shown in FIG. 6A), 0 is written to the register 208.

If a page table exists in the data buffer (storage means) of the initiator (another node), a page table fetch circuit 210 operates to fetch that page table from the initiator. More specifically, the page table fetch circuit 210 instructs a transmission header creation circuit 260 to fetch the page table then, when the fetch is completed, instructs a page table creation circuit 220 to update the page table address and page table size.

If no page table exists in the data buffer of the initiator, the page table creation circuit 220 operates to create a virtual page table. More specifically, the page table creation circuit 220 creates the page table in accordance with an algorism described later when main control circuit 200 instructs the creation of the page table. It then performs processing to write the created page table to the HW page table area in RAM, through an element hold circuit 230 and a buffer interface 290.

Note that the determination of whether or not a page table exists is based on the setting in the register 208, as described above. The page table that has been fetched or created by the page table fetch circuit 210 and/or the page table creation circuit 220 is stored in the HW page table area (AR1 in FIG. 8) in RAM.

The page boundary size specified by the ORB from the initiator is set in a register 222 comprised within the page table creation circuit 220. If a page table exists, the page table address and the page table size (number of elements) specified by the ORB are set in registers 224 and 226 (see FIG. 6B). If no page table exists, on the other hand, the start address and the data length of the transfer data are set (see FIG. 6C). An element counter 228 counts the number of elements (element pointers) of the page table during the creation of the page table.

The element hold circuit 230 holds information on the page table elements that are objects to be processed by the SBP-2 core, and comprises a register 232 for holding the segment length of the page table elements and a register 234 for holding a segment offset address.

The transfer execution control circuit 240 controls the execution of data transfer (data stream transfer) by the SBP-2 core and comprises registers 242 and 244. The register 242 displays the number of the page table element that is currently being processed. The number of the page table element at which the data transfer starts is set by the firmware in the register 244. This makes it possible for the firmware to start the data transfer from any page table element.

A payload division circuit 250 performs processing to divide the transfer data into packets of the payload size. The maximum payload size, specified by an ORB, is set in a register 252 comprised within the payload division circuit 250. Another register 254 displays the actual payload size. The payload division circuit 250 performs the payload division processing, based on the segment length of page table elements that is read out from the HW page table area (AR1 of FIG. 8) and held in the register 232 and the maximum payload size that is set in the register 252.

The transmission header creation circuit 260 creates the header of each request packet shown at A3 in FIG. 4 or B1 in FIG. 5, based on details such as a speed code and a destination ID that have been set by the firmware. The thus created header is stored in the HW transmission header area in the RAM (AR3 in FIG. 8). In this manner, this embodiment of the invention can greatly reduce the processing load on the firmware, because the automatic creation of headers of a series of request packet that is to be transferred continuously is done by the hardware.

A transaction control circuit 270 receives error information and status information from external circuit blocks such as the link core and performs processing for executing a transaction. On completion of the execution of the transaction, a transaction completion signal TComp goes active to inform the page table fetch circuit 210 and the payload division circuit 250. The SBP-2 core of this embodiment of the invention manages data transfers in transaction units, not packet units.

A split timer 280 loads a split time value when a transaction starts, then starts a count-down. When this count reaches zero, the fact that time-out has occurred is transmitted to the transaction control circuit 270.

The buffer interface 290 functions as an interface with the buffer manager 70 of FIG. 7. The configuration is such that each block of the SBP-2 core 84 requests access to the RAM 80 with respect to the buffer manager 70, through the buffer interface 290.

3.1 Main Control Circuit

The operation of the main control circuit 200 will now be described with reference to the flowchart of FIG. 11.

First of all, the main control circuit 200 determines whether or not a page table that has been previously stored in the HW page table area is to be used (step S1), then branches to step S5 if it is to be used or to step S2 if it is not going to be used. The setting that determines whether or not a page table that has been previously stored in the HW page table area is to be used is implemented by the firmware writing a given setting to a given register.

The main control circuit 200 then determines whether or not a page table exists in the data buffer of the initiator, based on the setting of the register 208 of FIG. 10 (step S2). If a page table exists, the main control circuit 200 instructs the page table fetch circuit 210 to start the fetch of the page table (step S3). If no page table exists, on the other hand, it instructs the page table creation circuit 220 to start the creation of a page table (step S4).

When the processing for fetching or creating the page table has ended, the main control circuit 200 instructs the transfer execution control circuit 240 to start the transfer execution processing (stream data task) (step S5).

Note that the page table creation circuit 220 of this embodiment of the invention creates the page table by the technique described below.

Figure 12:
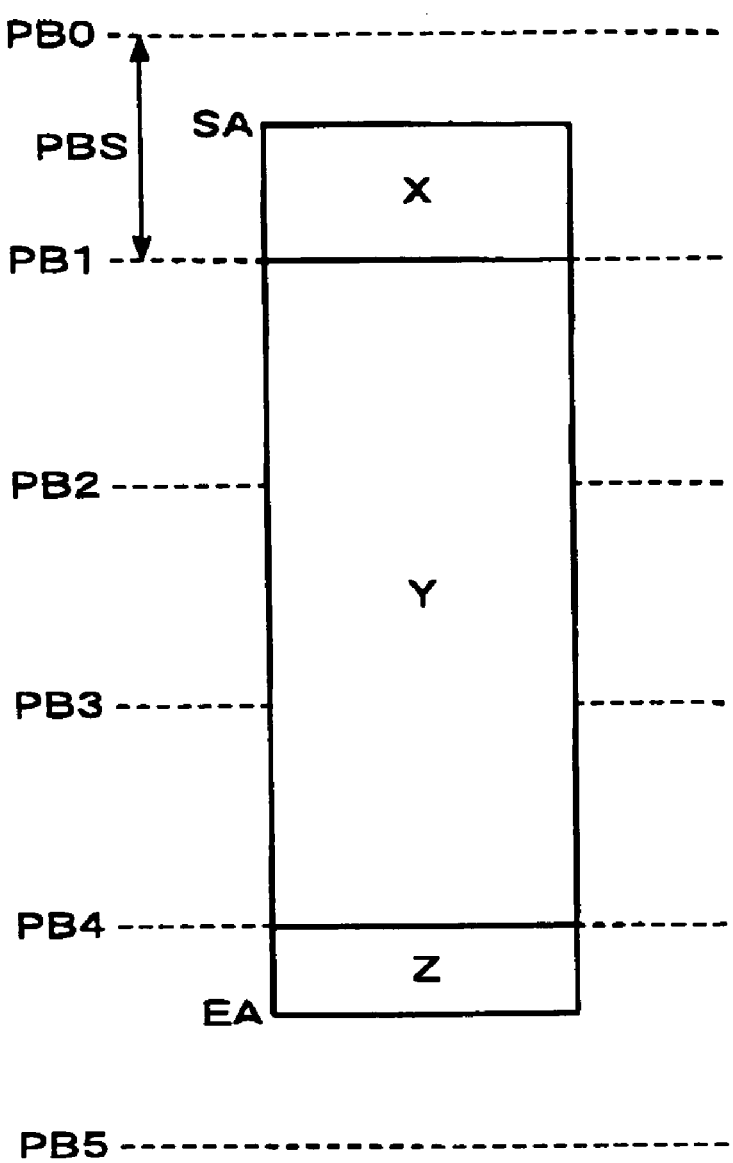
FIG. 12 illustrates the technique of creating a page table.

Assume, by way of example, that a start address SA of transfer data is between page boundaries PB0 and PB1 and an end address EA thereof is between page boundaries PB4 and PB5, as shown in FIG. 12. In this case, the page table creation circuit 220 of this embodiment of the invention creates a virtual page table in which the number of elements of the page table between the page boundary PB1 and PB4 (the Kth and Lth page boundaries) is one (broadly speaking, a predetermined number).

More specifically, it creates a three-page page table wherein a portion between the start address and the page boundary PB1 becomes an X-type page table element (a first page table element), a portion between the page boundaries PB1 and PB4 becomes a Y-type page table element (a second page table element), and a portion between the page boundary PB4 and the end address becomes a Z-type page table element (a third page table element).

It should be noted, however, that if the start address SA of the transfer data lies on the page boundary PB1 (the Kth page boundary), the X-type page table element is not created and thus a two-page page table is formed. Similarly, if the end address of the transfer data lies on the page boundary PB4 (the Lth page boundary), the Z-type page table element is not created and thus a two-page page table is formed. Furthermore, if the start address SA of the transfer data lies between the page boundaries PB0 and PB1 and the end address EA thereof lies between the page boundaries PB0 and PB1 or on the page boundary PB1, a one-page page table is created having just the X-type page table element between SA and BA.

In this embodiment of the invention, the payload division circuit 250 of FIG. 10 divides the transfer data into packets of the payload size, the maximum payload size of which is the divisor of the page boundary size. In other words, the data is divided into packets such that the maximum payload size MaxPLS is the divisor of the page boundary size PBS, as shown in FIG. 13.

If the maximum payload size MaxPLS is set to the divisor of the page boundary size PBS in this manner, this ensures that the payload of each packet does not traverse a page boundary, as shown at C1 and C2 in FIG. 13, by way of example. This ensures that data transfer can be done while observing the restrictions on traversing a page boundary, even if a page table is created such that the number of page table elements between the page boundaries PB1 and PB4 is one, as shown in this embodiment of the invention.

3.2 Transfer Execution (Stream Task) Control Circuit

Figure 14:
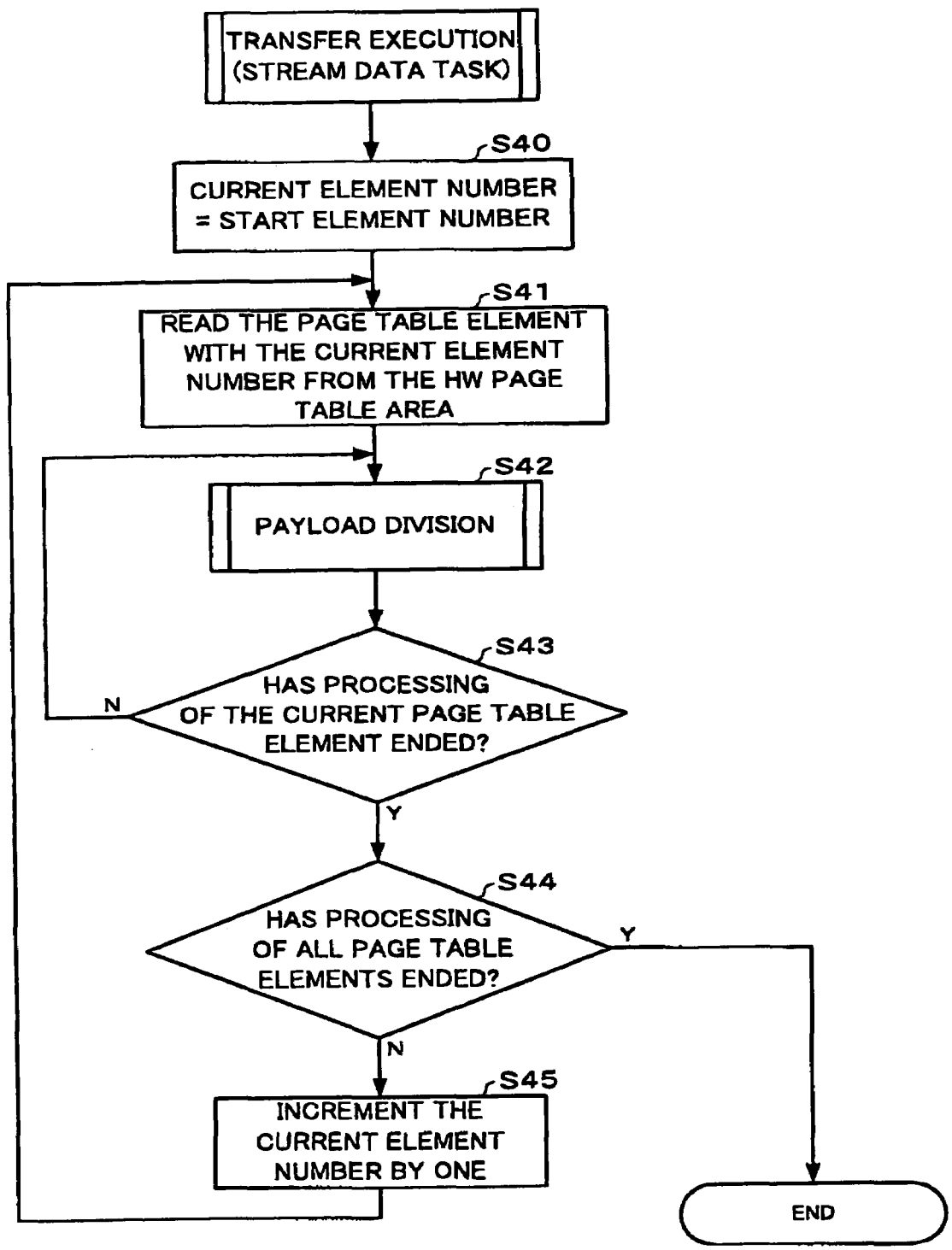
FIG. 14 is a flowchart illustrating the operation of the transfer execution control circuit.

The operation of the transfer execution control circuit 240 will now be described with reference to the flowchart of FIG. 14.

First of all, the current element number is loaded into the register 242 in FIG. 10 and the start element number is loaded into the register 244 (step S40). The page table element with the current element number is read out from the HW page table area in RAM (step S41). More specifically, the transfer execution control circuit 240 instructs the buffer interface 290 to read out the page table element that is to be processed. When this happens, the buffer interface 290 reads the page table element that is to be processed from the HW page table area in RAM, then writes the segment length of the page table element to the register 232 and the segment offset address to the register 234.

The transfer execution control circuit 240 instructs the payload division circuit 250 to start the payload division processing (step S42).

The transfer execution control circuit 240 then determines whether the processing of the current page table element has ended (step S43) and, if it has not ended, the flow returns to step S42. If the processing has ended, on the other hand, it determines whether or not the processing of all of the page table elements has ended (step S44) and, if it has not ended, the current element number is incremented by one (step S45) then the flow returns to step S41.

Note that the determination of whether or not the processing of all of the page table elements has ended is done by comparing the number of elements obtained by dividing the page table size stored in the register 226 by 8 with the current element number.

3.3 Payload Division Circuit

Figure 15:
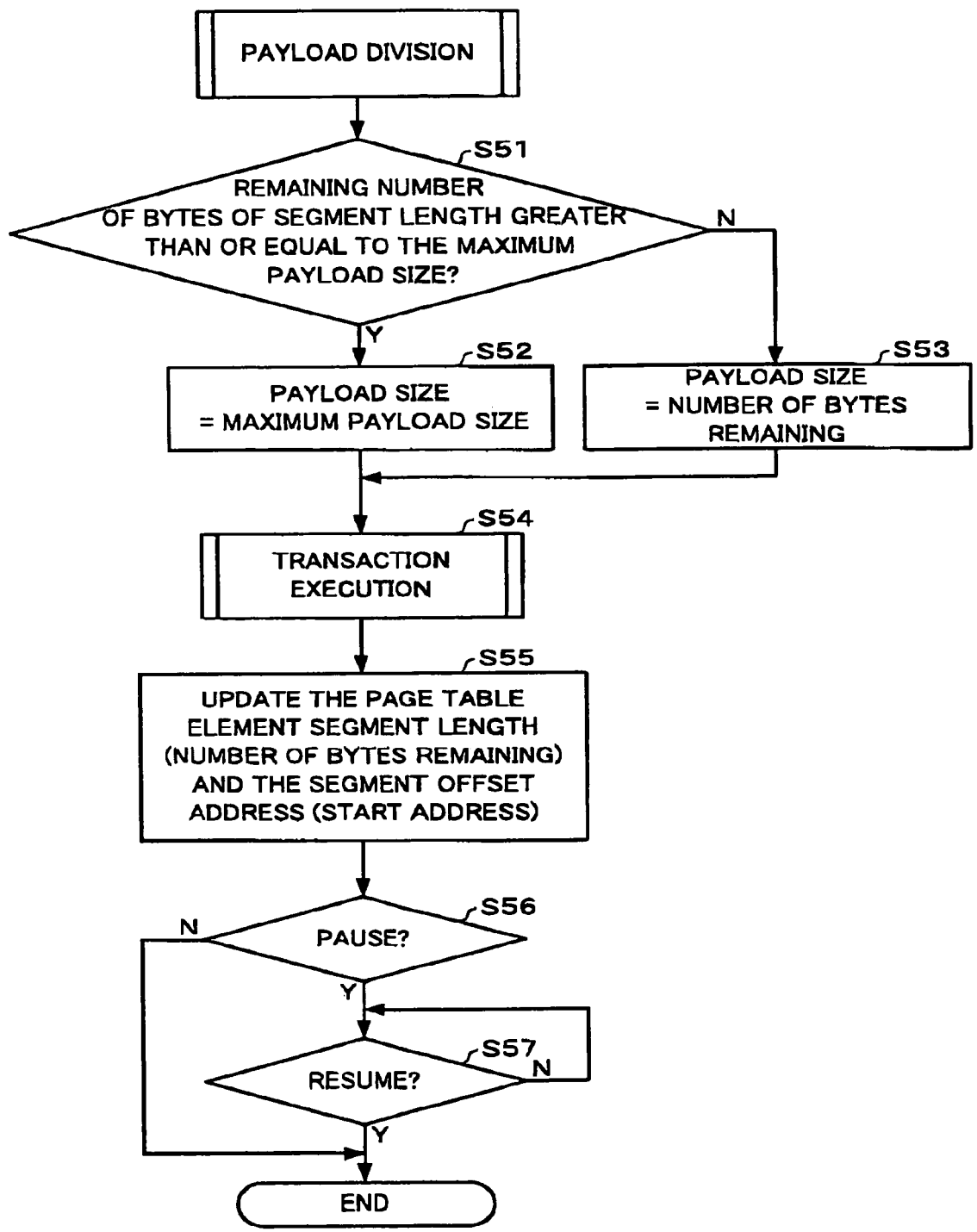
FIG. 15 is a flowchart illustrating the operation of the payload division circuit.

The description now turns to the operation of the payload division circuit 250, with reference to the flowchart of FIG. 15. The payload division circuit 250 operates to divide the transfer data into packets of the payload size, as shown in FIG. 13.

First of all, the payload division circuit 250 determines whether or not the remaining number of bytes of the segment length of the page table element that is stored in the register 232 of FIG. 10 is greater than or equal to the maximum payload size (step S51). If the remaining number of bytes is greater than or equal to the maximum payload size, the payload size of packets is set to the maximum payload size (step S52). If the remaining number of bytes is less than the maximum payload size, as shown at C3 or C4 in FIG. 13, the payload size of packets is set to the remaining number of bytes (step S53).

After the payload size has been set, the transmission header creation circuit 260 is instructed to start the transaction execution processing (create a transmission header) (step S54). If transaction completion is posted by the TComp signal from the transaction control circuit 270, the element hold circuit 230 is instructed to update the segment length (number of bytes remaining) and the segment offset address (start address) of the page table elements that are stored in the registers 232 and 234 (step S55).

The payload division circuit 250 then determines whether or not to pause the processing, based on the Pause signal from the main control circuit 200, (step S56) or, if the processing has been paused, it resumes the processing on condition that the Pause signal has gone inactive (step S57).

3.4 Transmission Header Creation Circuit and Transaction Control Circuit

Figure 16:
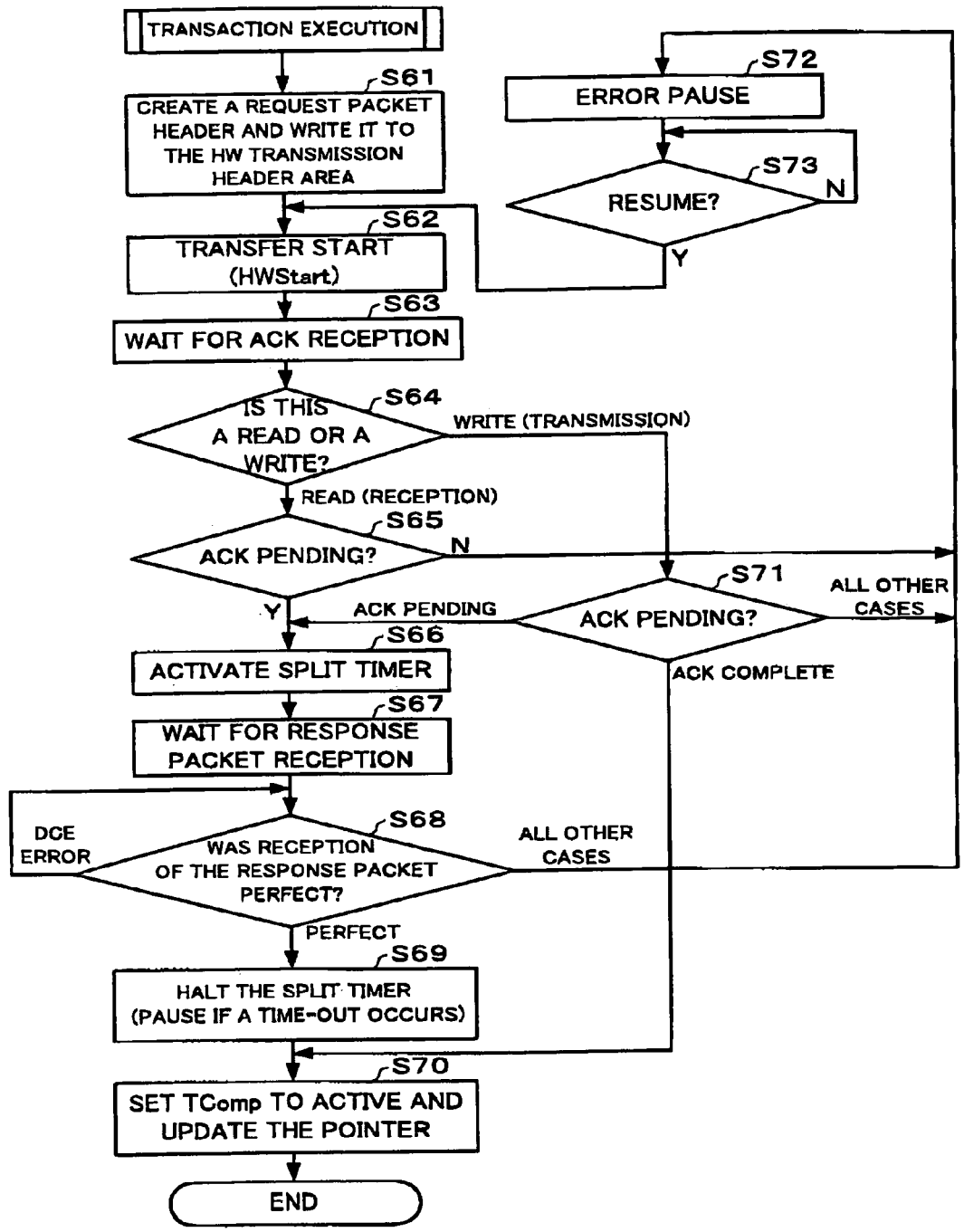
FIG. 16 is a flowchart illustrating the operation of the transmission header creation circuit and the transaction control circuit.

The operation of the transmission header creation circuit 260 and the transaction control circuit 270 will now be described, with reference to the flowchart of FIG. 16.

The transmission header creation circuit 260 first creates a request packet header and writes it to the HW transmission header area (AR3 of FIG. 8) (step S61). More specifically, if data is to be sent to the initiator as at A3 in FIG. 4, a header for a write request (block write request) packet is written to the HW transmission header area. If data is to be received from the initiator as at B1 in FIG. 5 or if a page table is to be fetched, on the other hand, a header for a read request packet is written to the HW transmission header area.

A transfer start signal (HWStart) is then made active to instruct the start of the transfer (step S62) and the transaction control circuit 270 waits from an ACK from the initiator (step S63).

If the transmission packet was a read request packet, the transaction control circuit 270 determines whether or not the state is ACK pending (step S65) and, if the state is not ACK pending, the flow proceeds to step S72 to set an error pause state. If the state is ACK pending, on the other hand, the transaction control circuit 270 instructs the activation of the split timer (step S66) and waits for the reception of a response packet (step S67).

The transaction control circuit 270 then determines whether or not the reception of the response packet was perfect (step S68). If there is a DCE error, it waits again for the reception of a response packet; or if the reception was perfect, the flow proceeds to step S69; or in all other cases the flow proceeds to step S72 to set the error pause state. If the flow has branched to step S69, the split timer is instructed to stop, the TComp signal is made active and the transfer data pointer is updated (step S70).

If the transmission packet was a write request packet, on the other hand, the transaction control circuit 270 first determines whether or not the state is ACK pending (step S71). If the state is ACK pending, the flow proceeds to step S66; if the state is ACK complete, the flow proceeds to step S70; and in all other cases, the flow proceeds to step S72 to set the error pause state.

Note that if the flow has branched to step S72 and the error pause state has been set, the flow proceeds to step S62 on condition that processing has been resumed (step S73). In other words, the transmission header that has already been written to the HW transmission header area is re-used and the transfer restarts.

4. Arbitration of Hardware (HW) Transfer and Firmware (FW) Transfer

With this embodiment of the present invention as described above, continuous packet transfer is executed automatically by the hardware, as shown at A3 in FIG. 4 or B1 in FIG. 5. More specifically, the firmware first issues an HW transfer start command (first start command) that instructs continuous packet transfer (by writing 1 to the register 202 of FIG. 10). When this happens, the hardware or the SBP-2 core automatically executes page table fetch or creation processing, payload division processing, transmission header creation processing, transfer start processing for each packet, and error processing. This divides transfer data equivalent of a page table (transfer data of a size specified by the ORB read command or write command) into a series of packets and transfers the thus-divided series of packets automatically. When the transfer of all of the packets is complete, an interrupt or the like is used to inform the firmware of that fact. The firmware need only issue the HW transfer start command then wait for the completion of the continuous packet transfer. As a result, the processing load on the firmware can be greatly reduced, making it possible to increase the actual transfer speed of the data transfer control device.

In addition to the HW transfer start command which instructs continuous packet transfer (HW transfer) in the above described manner, the firmware may also issue an FW transfer start command (second start command) that instructs the transfer of a single packet. If a request packet has been transmitted in from another node, for example, it is necessary to transmit a response packet corresponding to that request packet back to the other node. In such a case, the firmware issues the FW transfer start command to transmit that response packet. The response packet must be transferred before the split timer of the other node times out. It is therefore necessary for the firmware to issue the FW transfer start command that transmits the response packet after it receives the request packet, at the soonest possible time.

However, once an HW transfer (continuous packet transfer) has started, it is necessary to wait for a certain amount of time until all of the packets have been transferred. This wait time could be extremely long, particularly when the size of the transfer data is large. Various problems could therefore occur, such as the split timer of another node timing out while waiting for the completion of the HW transfer.

This embodiment of the invention provides arbitration such that, if an FW transfer start command is issued during the HW transfer period, the processing waits for the completion of one transaction (or one packet transfer) in the HW transfer and then it permits the FW transfer (packet transfer initiated by the FW transfer start command).

Figure 17:
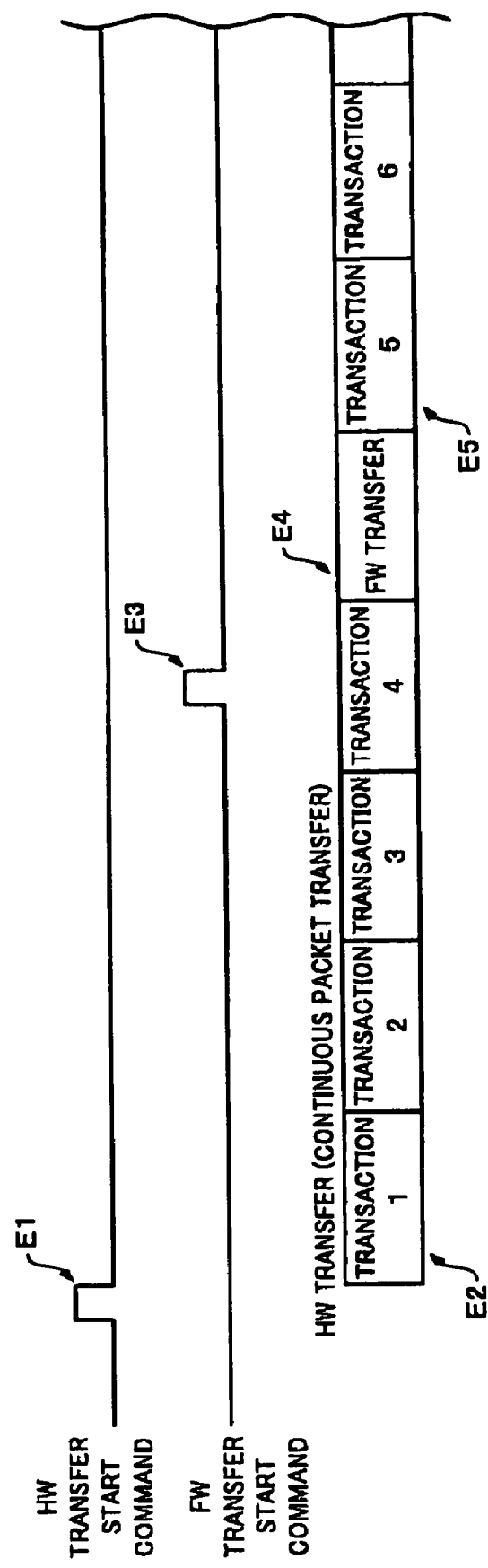
FIG. 17 illustrates the technique of arbitrating between HW transfer and FW transfer.

If an HW transfer start command is issued at E1 as shown in FIG. 17 by way of example, the HW transfer starts at E2. If an FW transfer start command is issued at E3 in this case, the processing waits for the completion of transaction 4 shown at E4, and then it transfers one packet by FW transfer. When the FW transfer is completed, the HW transfer restarts at E5.

This configuration enables the FW transfer to interrupt midway through the HW transfer, so that the FW transfer can be executed without waiting for the completion of the HW transfer. This makes it possible to prevent the problem of the split timer of another node timing out while waiting for the FW transfer.

Since the FW transfer is done after a wait for the completion of one transaction, as shown at E4 in FIG. 17, problems such as a transfer error in the HW transfer may not occur.

During the period from the completion of one transaction to the start of the next transaction, the link core and the PHY device in the lower layer are not occupied by the SBP-2 core. This makes it ideal to use the link core and the PHY device that are not being occupied by the SBP-2 core to transfer a packet of FW transfer during this period.

Note that the above description was based on the assumption that FW transfer is done after waiting for the completion of one transaction (a request packet and a response packet in answer to that request packet), but it is equally possible to perform the FW transfer after waiting for the completion of a single packet transfer.

4.1 Configuration and Operation of Arbitration Circuit

The configuration and operation of the arbitration circuit of this embodiment of the invention are described in detail below.

Figure 18:
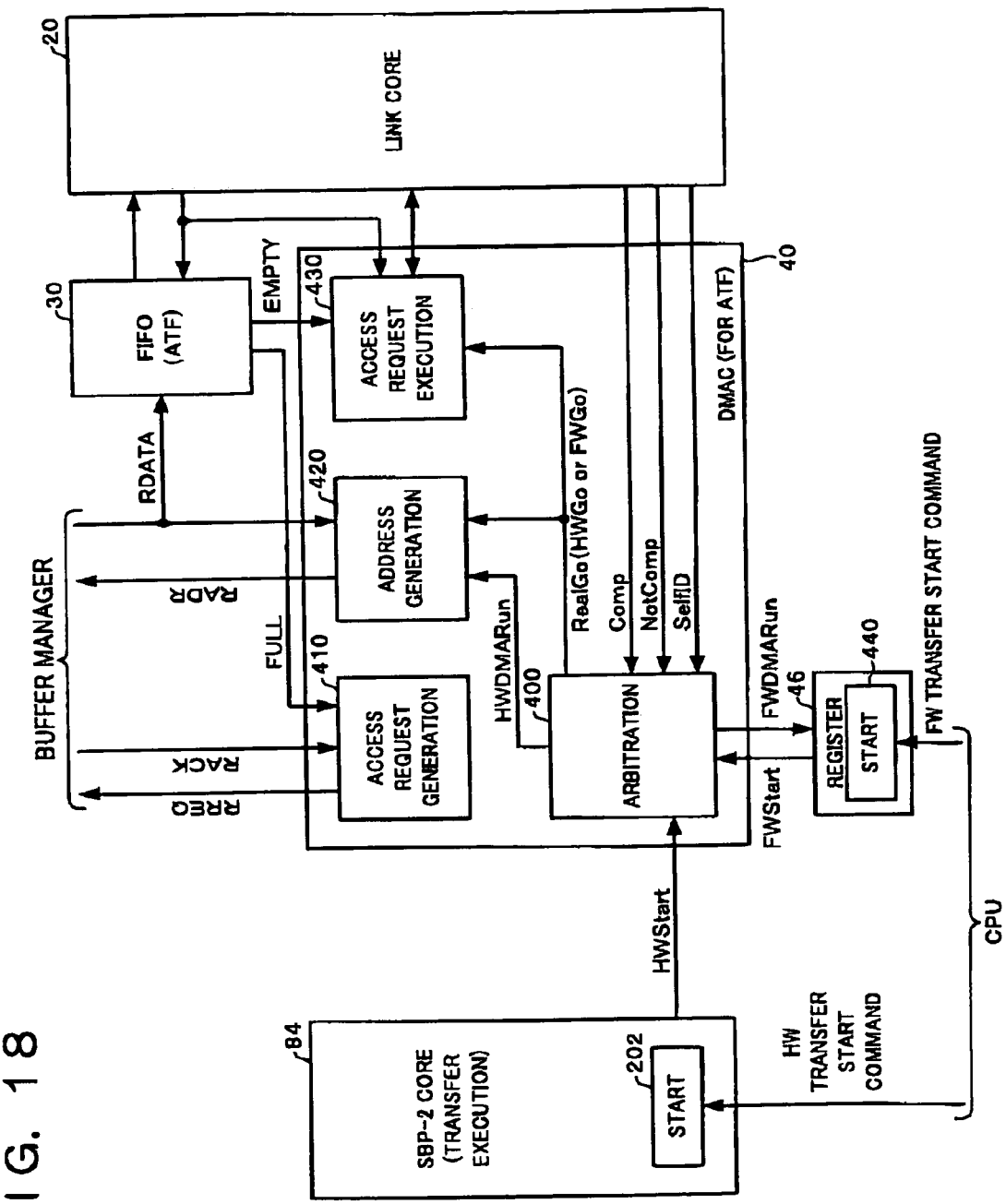
FIG. 18 shows an example of the structure of a DMAC comprising the arbitration circuit of this embodiment of the invention.

A detailed example of the structure of the DMAC 40 of FIG. 7 is shown in FIG. 18.

In FIG. 18, the DMAC 40 comprises an arbitration circuit 400, an access request generation circuit 410, an address generation circuit 420, and an access request execution circuit 430.

In this case, the arbitration circuit 400 arbitrates between HW transfers and FW transfers. More specifically, it provides arbitration such that, if an FW transfer start command is issued during the HW transfer period, the processing waits for the completion of one transaction (or one packet transfer) in the HW transfer and then it permits packet transfer initiated by the FW transfer start command.

If the CPU (firmware) issues an HW transfer start command (first start command) and writes 1 to the register 202, for example, the HW transfer is started by the SBP-2 core 84 (transfer execution circuit). The SBP-2 core 84 makes HWStart (a first start signal) go to 1 (active) at each request for the start of transfer of a packet (transaction), as shown at step S63 in FIG. 16.

If the CPU issues an FW transfer start command (second start command) and writes 1 to a register 440, on the other hand, the start of an FW transfer is requested and FWStart (a second start signal) goes active.

The arbitration circuit 400 receives these HWStart and FW start signals and Comp, NotComp, and SelfID signals from the link core 20, and performs arbitration therewith.

The access request generation circuit 410 receives a RACK signal, which is an acknowledgment read from the buffer manager 70, and a FULL signal from the FIFO 30, then outputs a RREQ signal, which is the read-out request, to the buffer manager 70.

The address generation circuit 420 receives various signals such as HWDMARun and RealGo from the arbitration circuit 400 and RDATA from the buffer manager 70, then generates RADR which is a read address in the RAM 80.

The access request execution circuit 430 receives various control signals, such as RealGo from the arbitration circuit 400 and EMPTY from the FIFO 30, then performs processing to execute the access request.

Figure 19A:
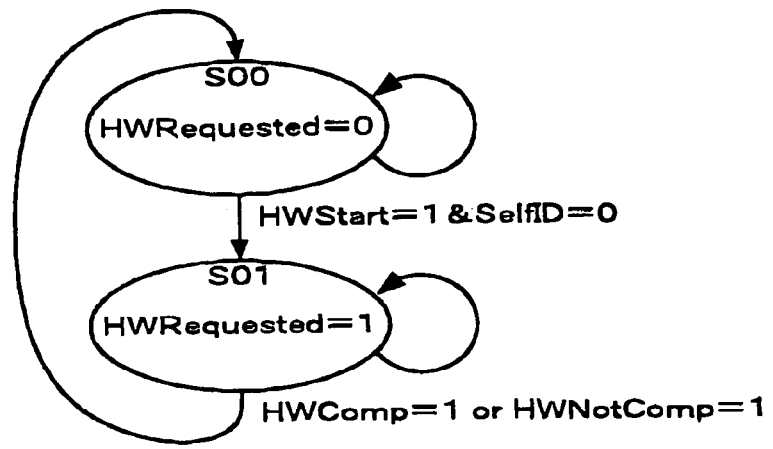
FIGS. 19A and 19B are state transition chart illustrating the operation of the arbitration circuit.
Figure 19B:
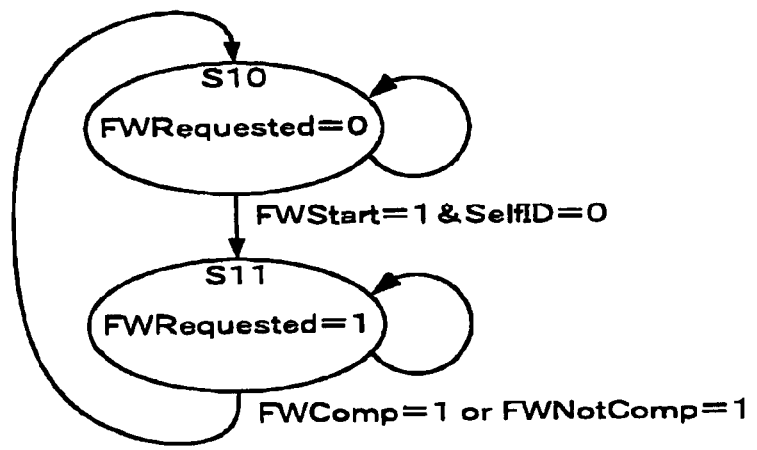
Figure 20:
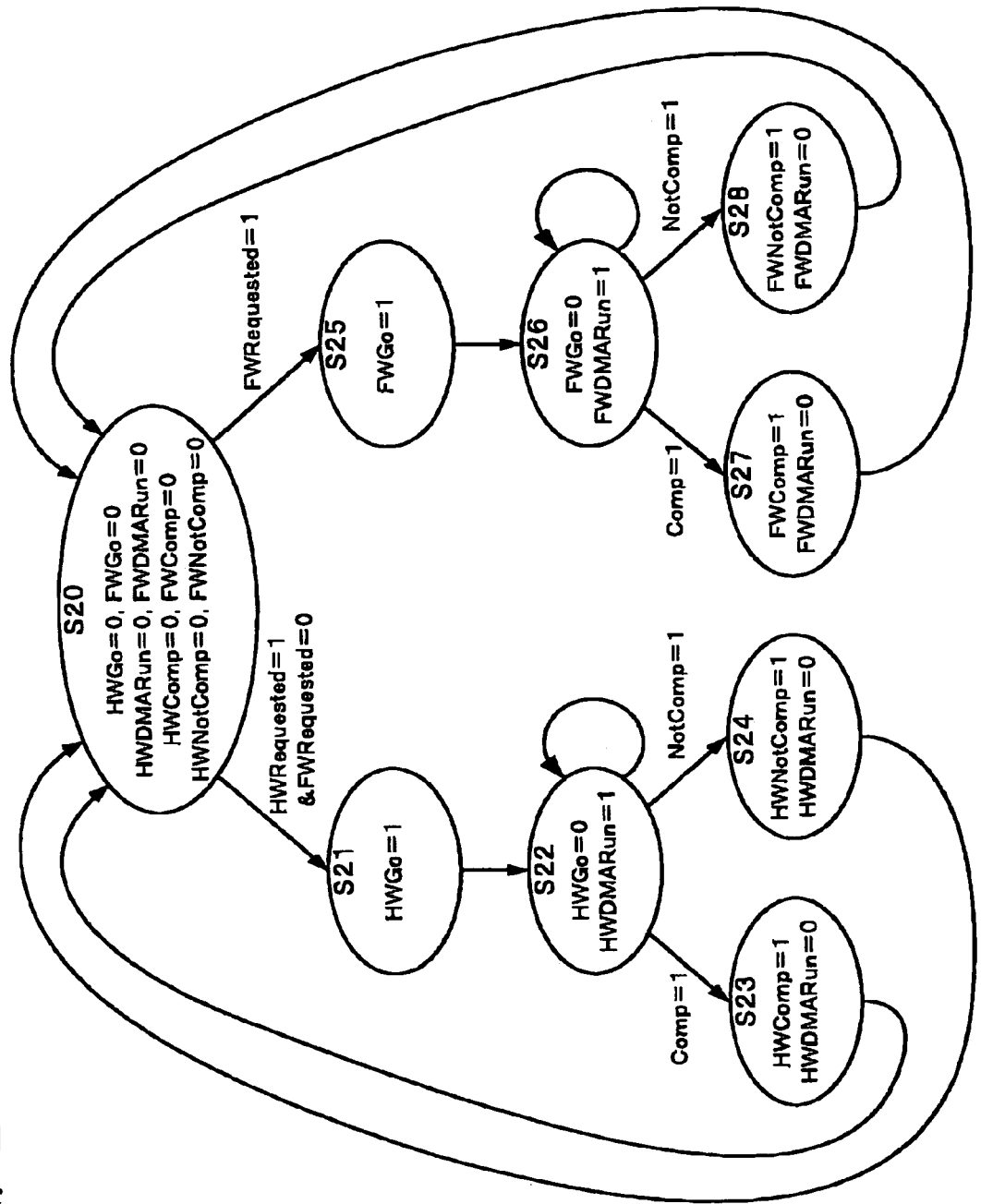
FIG. 20 is another state transition chart illustrating the operation of the arbitration circuit.

State transition charts for the arbitration circuit 400 are shown in FIGS. 19A, 19B, and 20.

In a state S00 shown in FIG. 19A, an HWRequested signal goes to 0. If the HWStart signal goes to 1 and also the SelfID (self-identification period) signal goes to 0 in this state, the state changes to a state S01 at the next clock and the HWRequested signal goes to 1. In other words, if the HWStart signal goes to 1 outside of the self-identification period, the HWRequested signal that indicates that an HW transfer has been requested goes to 1.

In a state S10 shown in FIG. 19B, an FWRequested signal goes to 0. If the FWStart signal goes to 1 and also the SelfID signal goes to 0 in this state, the state changes to a state S11 at the next clock and the FWRequested signal goes to 1. In other words, if the FWStart signal goes to 1 outside of the self-identification period, the FWRequested signal that indicates that an FW transfer has been requested goes to 1.

In a state S20 shown in FIG. 20. HWGo, FWGo, HWDMARun, FWDMARun, HWComp, FWComp, HWNotComp, and FWNotComp signals are all 0.

If the HWRequested signal goes to 1 (state S01 in FIG. 19A) and also the FWRequested signal goes to 0 in state S20, the state changes to a state S21 at the next clock and the HWGo signal that causes the start of HW transfer goes to 1. The HWGo signal goes to 0 and the HWDMARun signal goes to 1 at the next clock (state S22).

If the Comp signal, which is a transfer completion signal from the link core 20, then goes to 1, the HWComp signal goes to 1 and the HWDMARun signal goes to 0 at the next clock (state S23). If the transfer is not completed correctly, on the other hand, the NotComp signal that indicates that fact goes to 1, then the HWNotComp signal goes to 1 and the HWDMARun signal goes to 0 at the next clock (state S24).

If the FWRequested signal goes to 1 (state S11 in FIG. 19B) in state S20, the state changes to a state S25 at the next clock and FWGo signal that causes the start of FW transfer goes to 1. The FWGo signal goes to 0 and the FWDMARun signal goes to 1 at the next clock (state S26).

If the Comp signal then goes to 1, the FWComp signal goes to 1 and the FWDMARun signal goes to 0 (state S27). If the NotComp signal goes to 1, on the other hand, the FWNotComp signal goes to 1 and the FWDMARun signal goes to 0 at the next clock (state S28).

The operation of the arbitration circuit 400 will now be described with reference to the timing waveform charts of FIGS. 21, 22, and 23.

FIG. 21 is a timing waveform chart showing what happens if HWStart (the first start signal) goes active before FWStart (the second start signal).

If the HWStart signal from the SBP-2 core 84 goes to 1 at F1 in FIG. 21, the HWRequested signal goes to 1 at F2 (state S01 of FIG. 19A). When that happens, the HWGo signal goes to 1 at F3 (state S21 of FIG. 20) and the RealGo signal that is output to the address generation circuit 420 and the access request execution circuit 430 goes to 1 at F4. This starts the HW transfer processing done by the address generation circuit 420 and the access request execution circuit 430.

If the HWGo signal goes to 1, the HWDMARun signal that is output to the address generation circuit 420 goes to 1 at F5 (state S22). If the transaction (packet transfer) is completed and the completion signal Comp from the link core 20 goes to 1 at F6, the HWComp signal goes to 1 at F7 and the HWDMARun signal goes to 0 at F8 (state S23). The HWRequested signal returns to 0 at F9 (state S00 of FIG. 19A).

If an FW transfer start command is issued during an HW transfer (in other words, if HWStart signal goes to 1 then the FWStart signal goes to 1 at F10, before the Comp signal goes to 1), on the other hand, the FWRequested signal goes to 1 at F11 (state S11 of FIG. 19B). In such a case, however, the FWGo signal does not go to 1 immediately, as shown at F12. After the HWComp signal has gone to 1 at F7, the FWGO signal goes to 1 at F13 (state S25) and the RealGo signal goes to 1 at F14.

If the FWGo signal goes to 1, the FWDMARun signal that is output to the register 440 (within the register 46) goes to 1 at F16. This masks any write to the register 440 by the CPU until the FWDMARun signal returns to 0.

If the completion signal Comp then goes to 1 at F17, the FWComp signal goes to 1 at F18 and the FWDMARun signal goes to 0 at F19 (state S27). The FWRequested signal then returns to 0 at F20 (state S10 of FIG. 19B). The HW transfer then restarts at F21.

With this embodiment of the invention as described above, if the FWStart signal goes to 1 after the HWStart signal has gone to 1, the HW transfer starts first then the FW transfer starts after one transaction of the HW transfer has been completed. When the FW transfer is completed, the HW transfer restarts.

FIG. 22 is a timing waveform chart showing what happens if the HWStart and the FWStart signals become active together (at the same timing).

If the HWStart and the FWStart signals go to 1 together, as shown at G1 and G2 in FIG. 22, the FW transfer is given priority, as shown at G3. As should be clear from the states S20 and S21 of FIG. 20, if the FWRequested signal goes to 1 as shown at G4 in FIG. 22, the FWGo signal goes to 1, regardless of whether the HWRequested signal is at 0 or 1. After the FW transfer has been completed at G5, the HW transfer starts at G6.

If the HWStart and FWStart go to 1 at the same time in a device in accordance with this embodiment of the invention as described above, the FW transfer has priority and is started first. This makes it possible for the device to send a response packet immediately in answer to a request packet sent from another node.

FIG. 23 is a timing waveform chart showing what happens if FWStart goes active before HWStart.

If the FWStart signal goes to 1 before the HWStart signal, as shown at H1 and H2 in FIG. 23, the FW transfer starts first as shown at H3. When the transfer of one packet has been completed by the FW transfer at H4, the HW transfer starts at H5.

If the HWStart signal goes to 1 after the FWStart signal in a device in accordance with this embodiment of the invention as described above, the FW transfer starts first, then the HW transfer starts after the FW transfer has been completed. This makes it possible for the device to send a response packet immediately in answer to a request packet sent from another node.

4.2 Address Switching Between HW Header Areas and Ordinary Header Areas

In this embodiment of the present invention, the header area (control information area) is divided into HW header areas (second control information areas) into which are written headers (control information) by the SBP-2 core, as shown at AR2 and AR3 in FIG. 8, and ordinary header areas (first control information areas) into which are written headers by the firmware or the link core, as shown at AR4 and AR6.

Such a configuration makes it possible to provide dedicated HW header areas in the SBP-2 core so that the SBP-2 core can write created headers sequentially to the HW header areas. This enables a simplification of the processing and circuit configuration of the SBP-2 core. In other words, if the HW header areas and ordinary header areas were not separated, headers created by the SBP-2 core would be mixed with other headers. This would cause problems such as making address control more complicated during the writing of headers and increasing the size of the circuitry of the SBP-2 core. If dedicated HW header-areas are provided in the SBP-2 core in accordance with this embodiment of the invention, these problems can be solved and the circuitry of the SBP-2 core can be made more compact.

This embodiment of the invention also enables the address generation circuit 420 of FIG. 10 to switch between generating addresses for the HW header areas or the ordinary header areas, based on the HWDMARun signal that is the arbitration result from the arbitration circuit 400.

More specifically, if the HWDMARun signal is 1 (for HW transfer), a pointer PTR is set to the HW transmission header area (AR3), as shown in FIG. 24 by away of example. The write addresses for transmission headers created by the SBP-2 core are generated by updating the pointer PTR.

If the HWDMARun signal is 0 (outside of HW transfer), on the other hand, the pointer PTR is switched by setting it to the transmission header area (AR6). The write addresses for transmission headers created by the firmware are generated by updating the pointer PTR.

The thus configured embodiment of this invention succeeds in switching addresses between the HW header areas and the ordinary header areas by a simple technique that uses only the HWDMARun signal from the arbitration circuit 400. This address switching ensures that the SBP-2 core can write created headers sequentially to the dedicated HW header areas within the SBP-2 core. As a result, it become simple for the hardware to create headers for a series of packets to be transferred continuously.

5. Separation of Data Areas (Separation into Orb Area and Stream Area)

With this embodiment of the invention, the RAM 80 (packet storage means) of FIG. 7 is divided into header areas (AR2. AR3, AR4, AR6) and data areas (AR5, AR7, AR8, AR9), as shown in FIG. 8, and also the data areas are divided into ORB areas (AR5 and AR7) and stream areas (AR5 and AR9).

In other words, the division of the RAM into header and data areas makes it possible for the firmware to read out headers sequentially from the header areas and write headers sequentially to the header areas. This has the advantage of reducing the processing load on the firmware to a certain extent. From the viewpoint of speeding up the data transfer even further, however, it has become clear that it is not sufficient simply to separate the header areas from the data areas.

As shown by way of example in FIG. 25A, a packet could be divided into headers and data, with headers 1, 2, and 3 stored in header areas and data 1, 2, and 3 stored in data areas.

In such a case, the data consists of ORBs for the SBP-2 (first layer) and streams for the application layer (second layer) that is an upper layer, as previously described. With the header and data areas in RAM being simply separated, however, the ORBs and streams will become mixed in the data areas, as shown at D1, D2, and D3 in FIG. 25A.

For that reason, the processing described below is necessary when transferring streams of data from RAM to an application-layer device. First of all, the data pointer is set to the D1 position and streams 11, 12, and 13 are read out, then the data pointer is changed to the D2 position and streams 21, 22, and 23 are readout. The data pointer is subsequently changed to the D3 position and streams 31, 32, and 33 are read out.

Simply separating the RAM into header and data areas in this fashion makes it necessary to control the switching of the data pointer position in a complex manner during the transfer of the streams to the application-layer device, which leads to complicated processing and an increase in the scale of the circuitry. In addition, it is not possible to read out the streams sequentially from the data areas, so the actual transfer speed of the data transfer control device cannot be increased by much.

Figure 26:
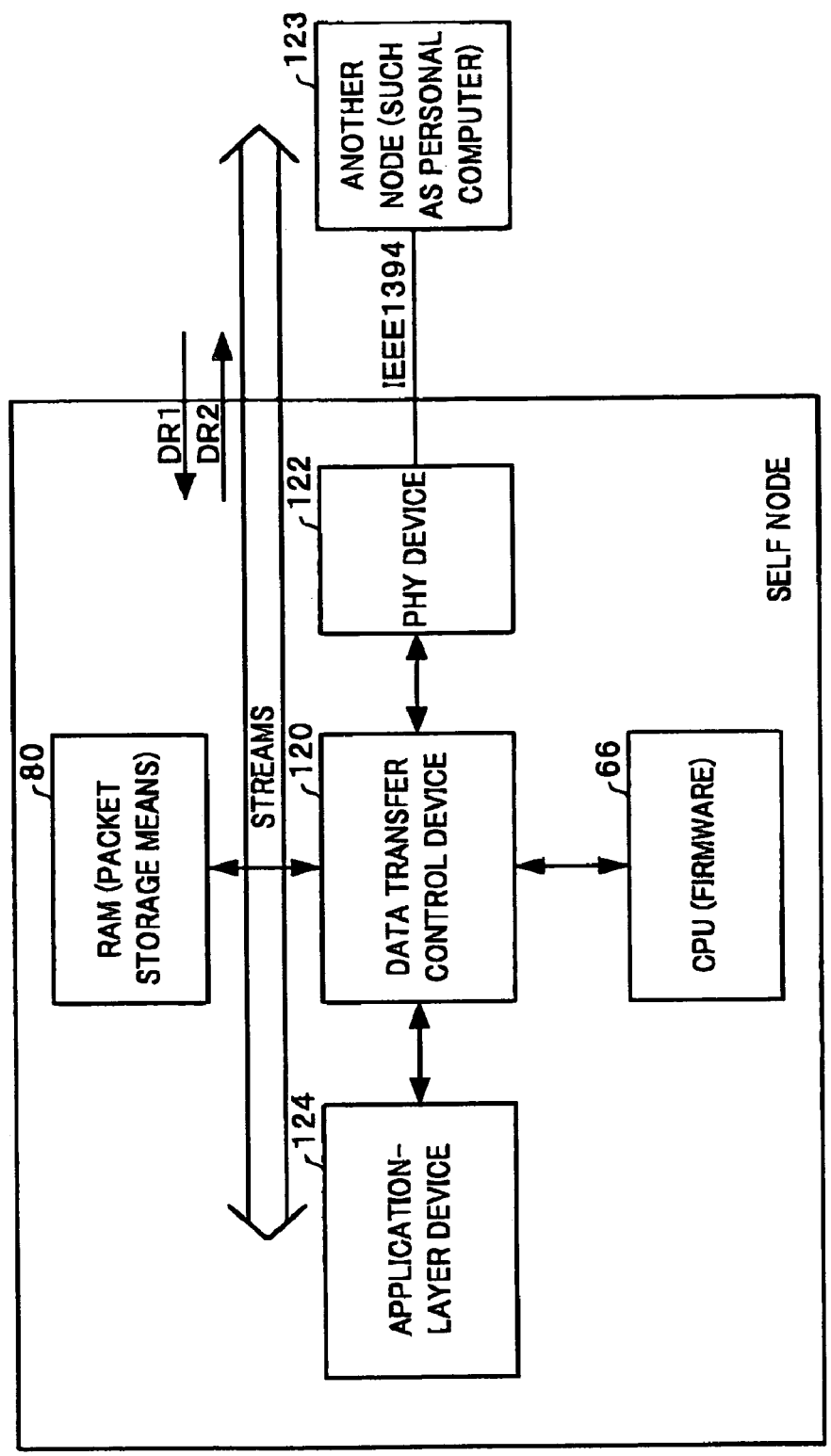
FIG. 26 shows the state of stream transfer between another node and an application-layer device.

The data areas could be separated into ORB areas and stream areas, as shown in FIG. 25B. Such a configuration makes it possible for the firmware to read out the ORBs 1, 2, and 3 sequentially from the ORB area. In addition, the previously described functions of the SBP-2 core 84 can be utilized to read out the streams 11 to 33 sequentially from the stream area, without intervention from the firmware, and transfer them to the application-layer device. In other words, it is possible to transfer streams (such as print data) between another node 123 (such as a personal computer) and an application-layer device (such as a device that processes print data for a printer), without the intervention of the firmware (CPU) 66, as shown in FIG. 26. As a result, the processing load on the firmware can be greatly reduced in comparison with the case shown in FIG. 25A, and also the data transfer can be made far faster.

Note that separating the data area into a transmission ORB area (AR7 of FIG. 8) and a transmission stream area (AR8) will increase the speed of data transfers. In other words, the speed of data transfer can be increased not only when streams are transferred from the other node 123 to the device 124 (self node) in the direction indicated by DR1 in FIG. 26, but also when streams are transferred from the application-layer device 124 to the other node 123 in the direction indicated by DR2.

6. Utilization of Transaction Label to Switch Write Areas

Under IEEE 1394, an object called a transaction label tl is used as information for identifying each transaction.

In other words, a transaction requesting node includes this transaction label tl within the request packet and sends it to the responding node. On receiving this request packet, the responding node includes the same tl in the response packet and sends it back to the requesting node. The requesting node can identify that this response packet is in response to a transaction requested by itself, by checking the tl within the returned response packet.

It is sufficient to ensure that the transaction label tl has a unique relationship with respect to the responding node. More specifically, if a requesting node ND1 has issued a transaction with tl=TN1 to a responding node ND2, it is not possible for the requesting node ND1 to issue another transaction with tl=TN1 to the responding node ND2 while that transaction remains completed. In other words, each transaction is uniquely specified by the transaction label tl, a source ID, and a destination ID. Conversely, the transaction label tl can have any value and other nodes must be able to receive any value of tl, provided the above restriction is respected.

When the requesting node has sent a request packet and is waiting for a response packet, the processing that is performed when the response packet arrives has already been determined. In this case, this embodiment of the invention uses a technique for drawing attention to the nature of the transaction label tl, as described below.

Figure 27A:
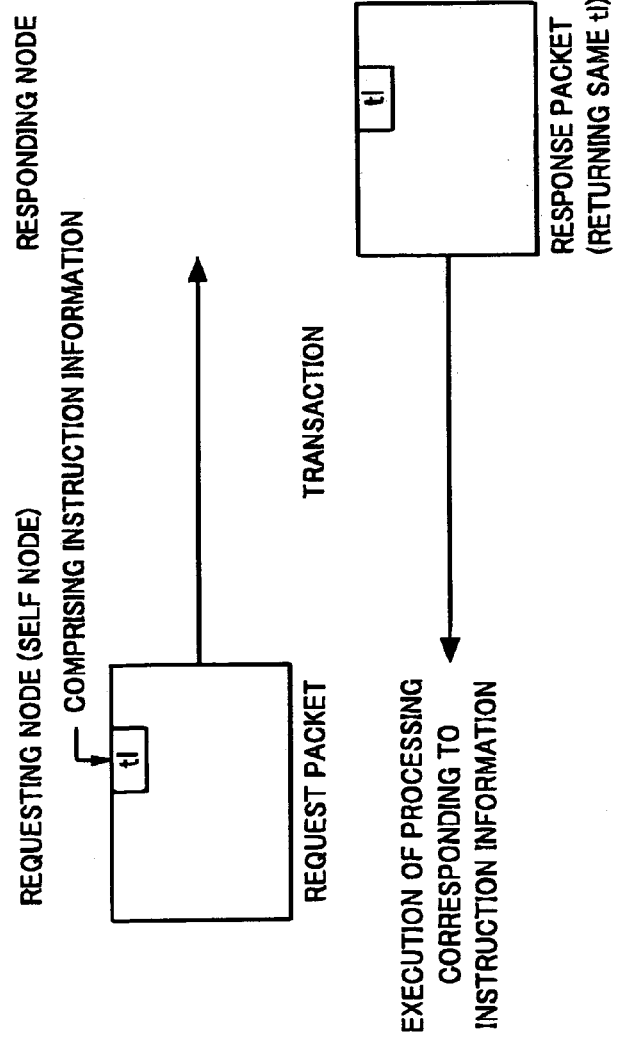
FIGS. 27A and 27B illustrate the transaction label.

When the requesting node sends a request packet for starting a transaction to the responding node, instruction information indicating the processing to be performed when the response packet is returned is comprised within the transaction label tl (broadly speaking, transaction identification information) comprised within the request packet, as shown in FIG. 27A. The configuration is such that the processing corresponding to the instruction information comprised within tl is executed when the response packet is received from the responding node.

This ensures that the processing corresponding to the instruction information comprised within tl can be executed by the SBP-2 core 84 and other hardware when the response packet is returned, without involving the firmware. This enables reductions in the processing load on the firmware, and also tends to increase data transfer speeds.

More specifically, when a response packet is received from the responding node in accordance with this embodiment of the invention, that response packet is stored in the area specified by the instruction information comprised within tl.

Figure 27B:
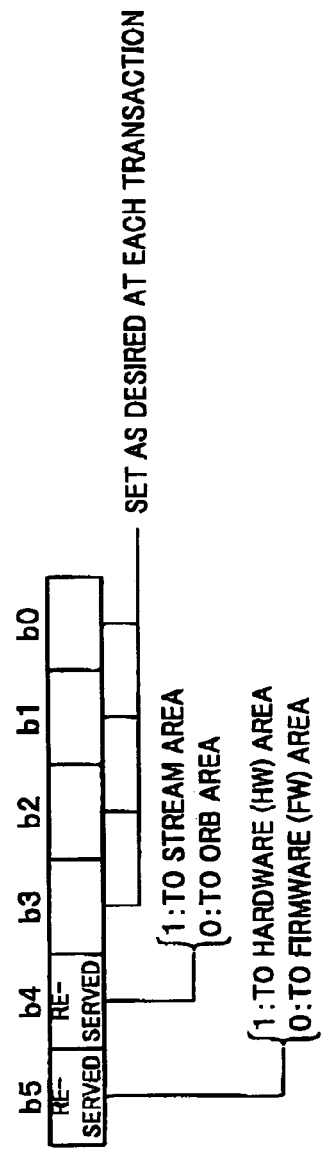

In other words, bits 5 and 4 of the transaction label tl are reserved bits used to express the instruction information, as shown in FIG. 27B.

If the returned response packet is to be written to the hardware (HW) area, bit 5 of tl of the request packet is set to 1 and it is sent to the responding node. If the returned response packet is to be written to the firmware (FW) area, on the other hand, bit 5 of tl of the request packet is set to 0 and it is sent to the responding node.

If the returned response packet is to be written to the stream area, bit 4 of tl of the request packet is set to 1 and it is sent to the responding node. If the returned response packet is to be written to the ORB area, bit 4 of tl of the request packet is set to 0 for transmission to the responding node.

This makes it possible to ensure that the header and data of the response packet are written to the corresponding areas shown in FIG. 28, when the response packet is returned.

In other words, if tl=1xxxxx (where "x" means "don't care"), the header of the response packet is written to the HW reception header area, but if tl=0xxxxx, it is written to the FW reception header area.

Similarly, if tl=11xxxx, the data of the response packet is written to the HW reception stream area, but if tl=10xxxx, it is written to the HW page table area. If tl=01xxxx, the data of the response packet is written to the FW reception stream area, but if tl=00xxxx, it is written to the FW reception ORB area.

This arrangement ensures that the header and data of a packet can be written automatically to the corresponding areas in RAM, without intervention from the firmware. The configuration of the hardware that writes the response packet into RAM can be simplified, leading to a reduction in the size of the data transfer control device.

As described with reference to FIG. 25B, the writing of packet headers to the header areas, ORBs to the ORB areas, and streams to the stream areas can be done automatically, which simplifies the hardware processing and promotes faster data transfer.

7. Electronic Equipment

The description now turns to examples of electronic equipment comprising the data transfer control device of this embodiment.

Figure 29A:
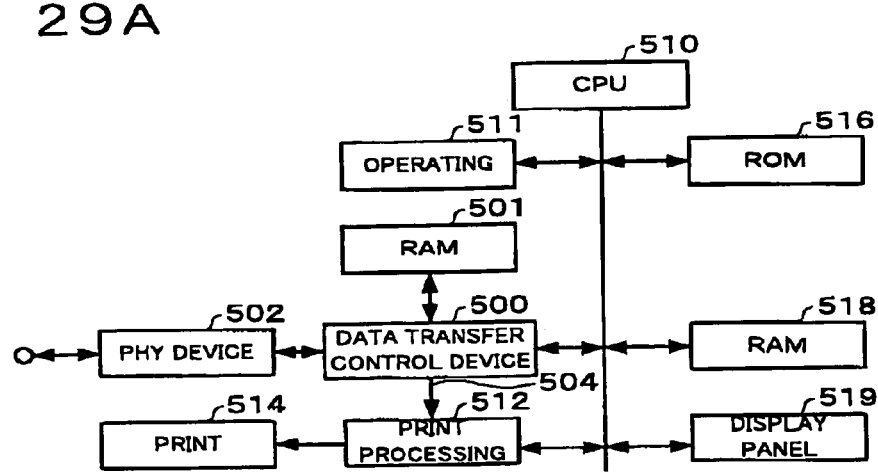
FIGS. 29A, 29B, and 29C show examples of the internal block diagrams of various items of electronic equipment.
Figure 30A:
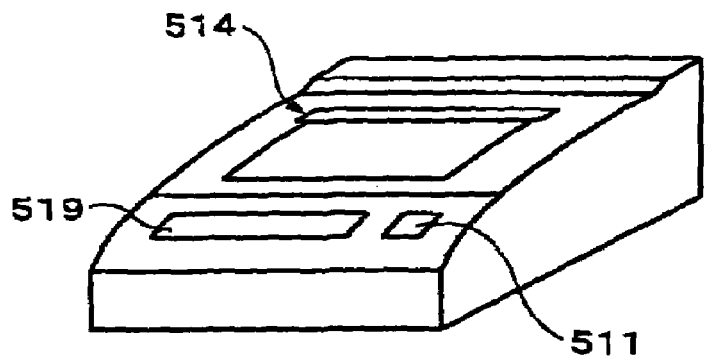
FIG. 30A, FIG. 30B, FIG. 30C show external views of various items of electronic equipment.

An internal block diagram of a printer that is one example of such electronic equipment is shown in FIG. 29A with an external view thereof being shown in FIG. 30A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514.

Figure 29B:
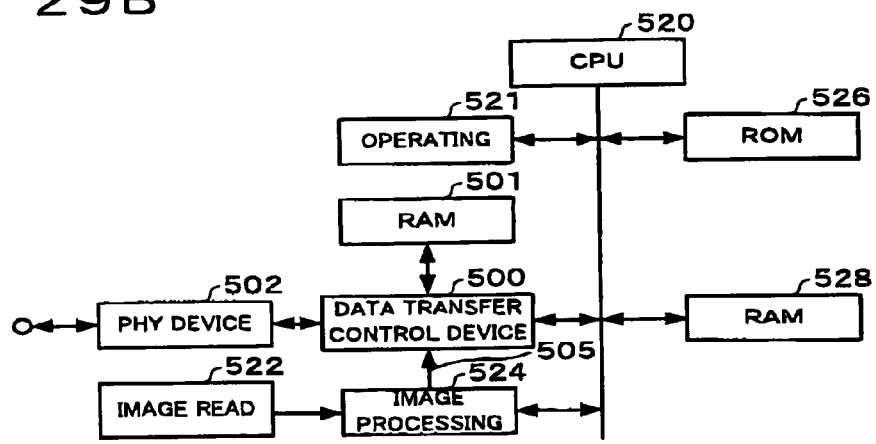
Figure 30B:
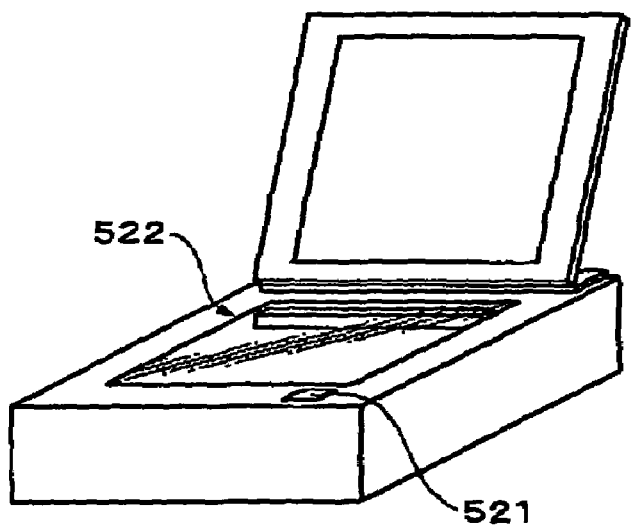

An internal block diagram of a scanner that is another example of electronic equipment is shown in FIG. 29B with an external view thereof being shown in FIG. 30B. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 29C:
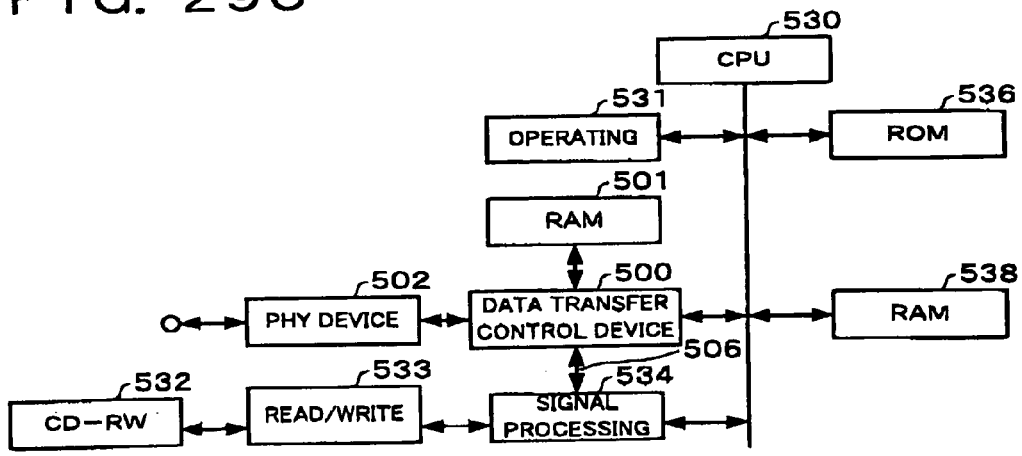
Figure 30C:
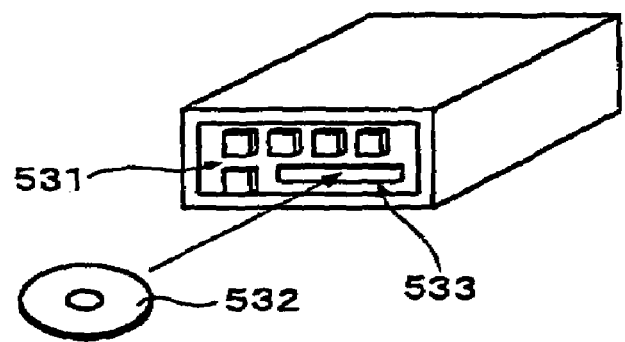

An internal block diagram of a CD-RW drive that is a further example of electronic equipment is shown in FIG. 29C with an external view thereof being shown in FIG. 30C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data transfer control device 500 creates packets by attaching headers and the like to this data, then sends those packets through the PHY device 502 to another node such as a personal computer.

Data that has been sent in from another node through the PHY device 502 and the data transfer control device 500, on the other hand, is sent directly to the signal processing section 534 over the bus 506. The data is subjected to given signal processing by the signal processing section 534 then is stored by a read/write section 533 in the CD-RW 532.

Note that another CPU could be provided to enable data transfer control by the data transfer control device 500, in addition to the CPU 510, 520, or 530 of FIG. 29A, 29B, or 29C.

In addition, a RAM 501 (equivalent to the RAM 80 of FIG. 7) is shown provided outside the data transfer control device 500 in FIGS. 29A, 29B, and 29C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment of the invention in electronic equipment also reduces the processing load on firmware running on the CPU, making it possible to use an inexpensive CPU and low-speed buses. This enables further reductions in the cost and size of the data transfer control device, thus reducing the cost and size of the electronic equipment.

Note that the electronic equipment that can employ a data transfer control device in accordance with the present invention is not limited to the above described embodiments, and thus various other examples can be considered, such as various types of optical disk drive (CD-ROM or DVD), magneto-optic disk drives (MO), hard disk drives, TVs, VTRs, video cameras, audio equipment, telephones, projectors, personal computers, electronic note books, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 7, but it is not limited thereto.

Similarly, the configuration of the transfer execution circuit (SBP-2 core) is most preferably that as shown in FIG. 10, but the present invention is not limited thereto and thus any circuitry can be used to divide transfer data into a series of packets for transmission, at least providing that the processing means (firmware) issues a first start command (HW transfer start command). For example, the transfer execution circuit preferably comprises circuit blocks such as a page table fetch circuit, a page table creation circuit, a payload division circuit, a transfer execution control circuit, and a transmission header creation circuit (control information creation circuit), but the configuration could be such that some of those circuit blocks are not comprised therein.

In addition, the arbitration technique used by the arbitration circuit is most preferably that described with reference to FIGS. 21, 22, and 23, but it is not limited thereto.

Furthermore, the techniques used for separating packets, writing packets to different areas in a packet storage means, and reading out data are also not limited to those described with reference to FIGS. 8 and 25B.

In addition, it is particularly preferable that the first data is data for the transaction layer and the second data is data for the application layer, but the first and second data items in accordance with the present invention are not limited thereto.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, the data transfer control device comprising:
   a transfer execution circuit that operates when a processing section has issued a first start command which instructs continuous packet transfer by hardware, for executing processing to divide transfer data into a series of packets and transfer the thus divided series of packets continuously; and
   an arbitration circuit that operates when the processing section has issued a second start command which instructs packet transfer while continuous packet transfer processing is being executed by the transfer execution circuit, for waiting until one transaction or one packet transfer in the continuous packet transfer has been completed then permitting packet transfer by the second start command;
   the transfer execution circuit including at least one of:
   a page table fetch circuit that operates when a page table exists in a storage memory of another node, to fetch the page table from the other node;
   a page table creation circuit that operates when no page table exists in the storage memory of the other node, to create a virtual page table, based on page boundary information;
   a payload division circuit for dividing transfer data into packets of a payload size;
   a transfer execution control circuit for controlling the execution of data transfer; and
   a control information creation circuit for creating control information of a request packet to be sent to the other node.

2. The data transfer control device as defined in claim 1, the arbitration circuit receiving a first start signal that goes active when there is a transfer start request from the transfer execution circuit, a second start signal that goes active when there is a transfer start request in accordance with the second start command, and a completion signal that goes active at transfer completion; then causing the start of transfer processing in accordance with the first start signal when the second start signal went active after the first start signal had gone active, and causing the start of transfer processing in accordance with the second start signal after the completion signal goes active.

3. The data transfer control device as defined in claim 1, the arbitration circuit receiving a first start signal that goes active when there is a transfer start request from the transfer execution circuit, a second start signal that goes active when there is a transfer start request in accordance with the second start command, and a completion signal that goes active at transfer completion; and giving priority to transfer processing in accordance with the second start signal when the first and second start signals have gone active together.

4. The data transfer control device as defined in claim 1, the arbitration circuit receiving a first start signal that goes active when there is a transfer start request from the transfer execution circuit, a second start signal that goes active when there is a transfer start request in accordance with the second start command, and a completion signal that goes active at transfer completion; then causing the start of transfer processing in accordance with the second start signal when the first start signal went active after the second start signal had gone active, and causing the start of transfer processing in accordance with the first start signal after the completion signal goes active.

5. A data transfer control device for transferring data among a plurality of nodes that are connected to a bus, the data transfer control device comprising:
   a transfer execution circuit that operates when a processing section has issued a first start command which instructs continuous packet transfer by hardware, for executing processing to divide transfer data into a series of packets and transfer the thus divided series of packets continuously; and
   an arbitration circuit that operates when the processing section has issued a second start command which instructs packet transfer while continuous packet transfer processing is being executed by the transfer execution circuit, for waiting until one transaction or one packet transfer in the continuous packet transfer has been completed then permitting packet transfer by the second start command, the arbitration circuit performing an arbitration between the continuous packet transfer by the first start command and the packet transfer by the second start command;
   randomly accessible packet storage memory having a control information area for storing packet control information and a data area for storing packet data; and
   an address generation circuit which generates a write address to the packet storage memory;
   the control information area of the packet storage memory being separated into a first control information area and a second control information area, control information of the second control information area being written by the transfer execution circuit; and
   the address generation circuit switching between generating addresses for the first control information area and addresses for the second control information area, based on an arbitration result a result of the arbitration from the arbitration circuit.

6. A data transfer control device for transferring data among a plurality of nodes that are connected to a bus, the data transfer control device comprising:
   a transfer execution circuit that operates when a processing section has issued a first start command which instructs continuous packet transfer by hardware, for executing processing to divide transfer data into a series of packets and transfer the thus divided series of packets continuously; and
   an arbitration circuit that operates when the processing section has issued a second start command which instructs packet transfer while continuous packet transfer processing is being executed by the transfer execution circuit, for waiting until one transaction or one packet transfer in the continuous packet transfer has been completed then permitting packet transfer by the second start command; and
   randomly accessible packet storage memory having a control information area for storing packet control information and a data area for storing packet data, the data area of the packet storage memory being separated into a first data area for storing first data for a first layer and a second data area for storing second data for a second layer, the second data being transferred by the continuous packet transfer processing of the transfer execution circuit.

7. The data transfer control device as defined in claim 6, when a request packet for starting a transaction is transmitted to another node, instruction information for instructing the processing to be performed when a response packet will be received from the other node being included within transaction identification information in the request packet; and when a response packet is received from the other node, control information and first and second data of the response packet being respectively written to the control information area and the first and second data areas, based on the instruction information comprised within the transaction identification information in the response packet.

8. Electronic equipment comprising:
   the data transfer control device as defined in claim 1;
   a device for performing given processing on data that has been received from another node via the data transfer control device and the bus; and
   a device for outputting or storing data that has been subjected to the processing.

9. Electronic equipment comprising:
   the data transfer control device as defined in claim 5;
   a device for performing given processing on data that has been received from another node via the data transfer control device and the bus; and
   a device for outputting or storing data that has been subjected to the processing.

10. Electronic equipment comprising:
    the data transfer control device as defined in claim 6;
    a device for performing given processing on data that has been received from another node via the data transfer control device and the bus; and
    a device for outputting or storing data that has been subjected to the processing.

11. Electronic equipment comprising:
    the data transfer control device as defined in claim 1;
    a device for performing given processing on data that is to be transferred to another node via the data transfer control device and the bus; and
    a device for fetching data to be subjected to the processing.

12. Electronic equipment comprising:
    the data transfer control device as defined in claim 5;
    a device for performing given processing on data that is to be transferred to another node via the data transfer control device and the bus; and
    a device for fetching data to be subjected to the processing.

13. Electronic equipment comprising:
    the data transfer control device as defined in claim 6;
    a device for performing given processing on data that is to be transferred to another node via the data transfer control device and the bus; and
    a device for fetching data to be subjected to the processing.

14. The data transfer control device as defined in claim 1, data transfer is performed in accordance with the IEEE 1394 standard.

15. The data transfer control device as defined in claim 5, data transfer is performed in accordance with the IEEE 1394 standard.

16. The data transfer control device as defined in claim 6, data transfer is performed in accordance with the IEEE 1394 standard.

* * * * *